United States Patent [19]

Musicus et al.

[11] Patent Number: 4,964,126
[45] Date of Patent: Oct. 16, 1990

[54] FAULT TOLERANT SIGNAL PROCESSING MACHINE AND METHOD

[75] Inventors: Bruce R. Musicus, Arlington; William S. Song, Cambridge, both of Mass.

[73] Assignee: Massachusetts Institute of Technology, Cambridge, Mass.

[21] Appl. No.: 251,572

[22] Filed: Sep. 30, 1988

[51] Int. Cl.[5] .............................................. G06F 11/10
[52] U.S. Cl. .................................... 371/36; 371/37.1
[58] Field of Search ................. 371/37.1, 36; 364/200, 364/900

[56] References Cited

U.S. PATENT DOCUMENTS 4,517,639  5/1985  Ferrell et al. ......................... 371/9.1
4,654,857  3/1987  Samson et al. ....................... 371/9.1

OTHER PUBLICATIONS

Jou et al., "Fault-Tolerant Matrix Operations on Multiple Processor Systems Using Weighted Checksums", Real Time Signal Processing VII, vol. 495, (1984), pp. 94-101.

Huang et al., "Algorithm-Based Fault Tolerance for Matrix Operations", IEEE Trans on Computers, vol. C-33, No. 6, (1984).

Jou et al., "Fault-Tolerant Matrix Arithmetic and Signal Processing on Highly Concurrent Computing Structures", Proc. IEEE, (1986), pp. 732-741.

Huang et al., "Low Cost Schemes for Fault Tolerance in Matrix Operations with Processor Arrays", Fault-Tolerant Computing, (1982), pp. 330-337.

Chou, "Algorithm-Based Error Detection of a Cholesky Factor Updating Systolic Array Using CORDIC Processors", Real Time Signal Processing XI, vol. 977, (1988), pp. 104-111.

Song et al., "A Fault-Tolerant Architecture for a Parallel Digital Signal Processing Machine", IEEE Int'l Conf. Comp. Design, (1987), pp. 385-390.

Primary Examiner—Charles E. Atkinson
Attorney, Agent, or Firm—Choate, Hall & Stewart

[57] ABSTRACT

The machine includes a plurality of processors each performing identical linear processing operations on its input signal. At least one checksum processor is provided to perform the same linear processing operation as the plurality of processors. Computing apparatus using inexact arithmetic forms a linear combination of the input signals to form an input checksum signal and for operating on the input checksum signal with the checksum processor to generate a processed input checksum signal. The same linear combination of the outputs of the plurality of processors is formed to produce an output checksum signal and the output checksum signal is compared with the processed input checksum signal to produce an error syndrome. A generalized likelihood ratio test is formed from the error syndrome for assessing a likeliest failure hypothesis. The fault tolerant multiprocessor architecture exploits computational redundancy to provide a very high level of fault tolerance with a small amount of hardware redundancy. The architecture uses weighted checksum techniques, and is suited for linear, digital, or analog signal processing.

13 Claims, 5 Drawing Sheets

FAULT TOLERANT SIGNAL PROCESSING MACHINE AND METHOD

BACKGROUND OF THE INVENTION

This invention relates to fault-tolerant signal processing machines and methods.

Many signal processing applications, both digital and analog, employ a number of identical linear processors processing multiple signals in parallel. For example, radar and sonar signal processing requires linear processing on large amounts of incoming data at a rapid rate, often in real time. Massive computational requirements often lead to highly parallel multiprocessor architectures. Oftentimes each of the processors is performing an identical linear processing task. Typical linear processing operations are filtering and the creation of transforms such as Fourier transforms. As the number of processors increases, so too does the frequency of hardware failure making fault tolerant systems desirable.

In conventional N-modular fault-tolerant computer designs, N copies of processors, memory, and I/O units are driven with the same program and the same data. Voter circuitry compares the outputs of the identical units to verify that all units are operating correctly. With 100% redundancy (N=2) combined with frequent software checkpoints, the voters can detect a failure, abort the current operation, and force a restart from the last checkpoint, using different processing hardware. With 200% redundancy (N=3), also known as Triple Modular Redundancy, the voters can immediately detect and correct a single transient or permanent failure without any visible effect on the outside world, or on performance. The disadvantage of schemes of this type, however, is that large amounts of hardware must be dedicated to monitoring potential faults, and very tight processor synchronization is required.

Other ideas for reducing the hardware overhead dedicated to fault tolerance include incorporating periodic self-test or using a few extra processors and memories as Roving Emulators to double-check selected computations. Unfortunately, although these systems use less than 100% redundancy, they do not detect or mask all faults, and they may take a while to detect a failure.

The huge hardware requirements for traditional fault-tolerant designs are disturbing because such high levels of redundancy are not required in related problem areas such as error-free communication over noisy channels. In these problems, Shannon's channel coding theorem guarantees that virtually error-free communication can be achieved using only a small amount of overhead for error coding. The trick is to exploit a model of the channel noise process, coding the data and spreading it across the channel bandwidth so that any noise spike may destroy a portion of many data bits, but not any entire bit. A reliable decoder is able to reconstruct any missing information in the original signal by exploiting the small amount of redundancy inserted by the reliable coder. Such error coding ideas can be conveniently extended to protect data transmission over possibly faulty busses or networks, and to protect data storage in possibly faulty memory cells. Unfortunately, such error coding ideas cannot be conveniently extended to protect against hardware failures in arithmetic units, or in other systems where the output is not simply a copy of the input.

Happily, if we restrict the class of applications, it is possible to apply low-redundancy, error coding ideas to protect computation. In particular, Huang and Abraham and Jou have suggested single error detection and correction techniques for matrix operations on linear or mesh-connected processor arrays using a weighted checksum approach. This invention presents a scheme for use in a fault-tolerant multiprocessor system, using weighted checksums to protect a variety of linear signal processing computations.

SUMMARY OF THE INVENTION

The fault-tolerant signal processing machine according to the invention includes a plurality of processors each performing identical linear processing operations on its input signal. At least one checksum processor is provided to perform the same linear processing operation as the plurality of processors. Computing apparatus using inexact arithmetic forms a linear combination of the input signals to form an input checksum signal and for operating on the input checksum signal with the checksum processor to generate a processed input checksum signal. The same linear combination of the outputs of the plurality of processors is formed to produce an output checksum signal and the output checksum signal is compared with the processed input checksum signal to produce an error syndrome. A generalized likelihood ratio test is formed from the error syndrome which is used for assessing a likeliest failure hypothesis. In a preferred embodiment, the generalized likelihood ratio test is computed based on a Gaussian model of computational noise. In this embodiment the form of the algorithm for forming the generalized likelihood ratio test is that various weighted quadratic functions of the error syndromes are computed, one for each failure hypothesis which measures the energy of the projections of the syndromes onto various combinations of weight vectors. A threshold constant is added to each function, then the largest of these functions is chosen.

A special case of particular interest is single fault detection. This can be achieved by using only one checksum processor and making all the weights non-zero. In this case, the algorithm reduces to comparing the weighted energy in the syndromes against a constant threshold, and declaring a hardware failure if the energy is above the threshold. Another special case of particular interest is single fault correction. This can be achieved by using at least two extra checksum processors. For single fault correction, several interesting classes of weights are suggested. By choosing the weights to be small integers or small powers of two, computational effort can be reduced greatly. In addition, by choosing the weights from a symmetrical range of integers so that they form a "complete" set, better noise behavior is achieved for the syndromes. In particular, if "orthogonal" linear computations are being performed, such as Fourier transforms, Hadamard transforms, and so forth, then the syndromes behave like "white Gaussian" random variables. This leads to much more efficient computational algorithms.

A number of physical computer architectures are disclosed herein which are used to implement the methods of the invention. These architectures include (1) grouping all processors on a single replicated bus, together with the replicated fault detection/correction processors, (2) using a replicated input distribution bus to give data to all C+N processors, and a replicated results bus to collect the processor and syndrome outputs and forward them to the replicated fault detection/correction units and the syndrome computers, and (3) using replicated multiplexers to distribute data to the N+C processors, multiplexers to collect the outputs and send them to the syndrome computers, and replicated multiplexers to send the outputs and syndromes to the replicated fault detection/correction units. Numerous hybrid architecture schemes combining these ideas may also be used. In addition, dedicated checksum and syndrome computers could be attached to each checksum processor or to all processors, or a single dedicated checksum unit could be used for both the checksum and syndrome calculations for a given checksum processor, or the checksum processor itself could perform all checksum and syndrome calculations. Other fault tolerant schemes besides replication could be used to make the data communications and fault detection/correction units fault tolerant. Spare processor, bus, and fault detection/correction units could be incorporated, with some mechanism used to replace parts which are consistently identified as faulty.

DESCRIPTION OF THE PREFERRED EMBODIMENT FAULT-TOLERANT SIGNAL PROCESSING MULTIPROCESSOR SYSTEMS

To achieve the computational levels often required in signal processing, a highly parallel multiprocessor architecture is often used. Our concern in this application is with large multiprocessor systems using identical processors to perform identical linear processing operations on streams of data. A typical radar or sonar application domain would be the Fast Fourier Transforms (FFTs) required in each range cell of the return echoes to implement doppler processing or beam forming. In this application, the N processors could compute the same FFT computation on different range cell data.

Figure 1:
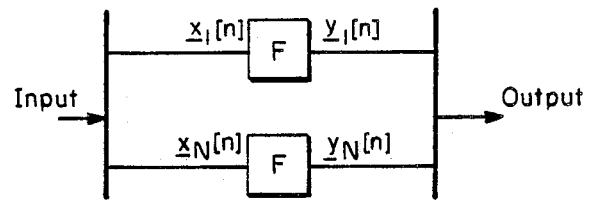
FIG. 1 is a schematic representation of a typical multiprocessor configuration.

FIG. 1 sketches a typical multiprocessor configuration. N processors are used on a rotating basis; the first input data segment is processed by the first processor, the second segment by the second processor, and so on. By the time the $N^{th}$ processor has received its input, the first processor will have output its results, and will be ready to receive the $(N+1)^{th}$ batch of data. The total processing throughput is thus approximately N times that of a single processor.

To make the scheme fault tolerant, start by adding C extra processors. A highly reliable front end encodes the input data and "spreads" the computation over all N+C processors. A highly reliable "decoder" collects the computed outputs from all the processors, and exploits the redundant computations in order to detect and/or correct any transient or permanent failures. It then outputs the corrected output stream.

Figure 2:
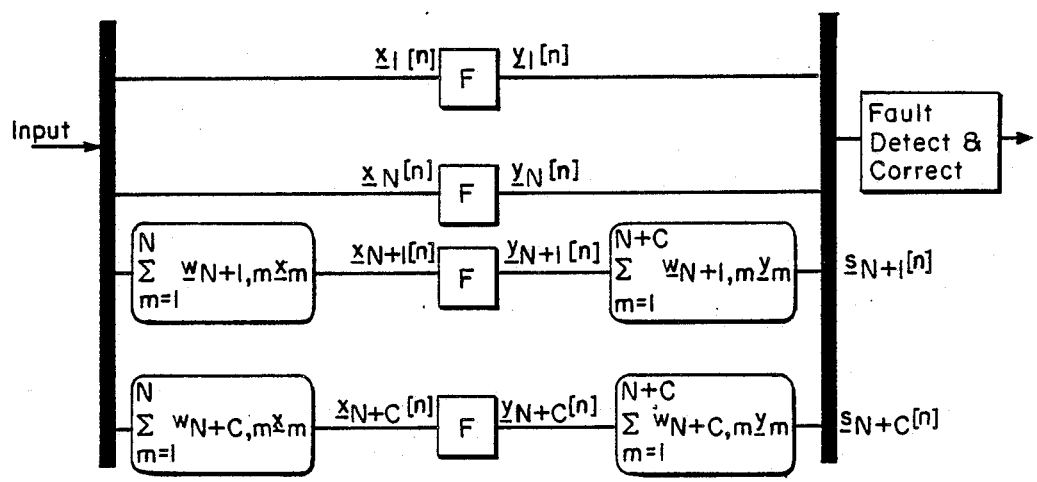
FIG. 2 is a schematic illustration of the weighted checksum coding scheme according to the invention.

FIG. 2 illustrates the weighted checksum coding scheme we use in this application. The first N processors work on the input streams. Let the vector $x_k[n]$ represent the $n^{th}$ segment of data distributed to processor k, where $1 \leq k \leq N$. Assume that all processors compute the same linear function F on their input, producing output $y_k[n]$:

$$y_k[n] = Fx_k[n] \text{ for } k=1,\ldots,N \qquad (1)$$

If $x_k[n]$ is p points long and $y_k[n]$ is q points long, then F is a q by p matrix. (The scheme can be easily generalized to a time varying linear function F[n].) The additional C checksum processors compute the same linear function as the other processors, but using input data which is a weighted linear combination of the $x_k[n]$. Their inputs will then be chosen as:

$$x_k[n] = \sum_{m=1}^{N} w_{k,m} x_m[n] \qquad (2)$$

$$\text{for } k = N+1,\ldots,N+C$$

where the $w_{k,m}$ are scalar weights. The outputs of these checksum processors will then be:

$$y_k[n] = Fx_k[n] = \sum_{m=1}^{N} w_{k,m} F x_m[n] \qquad (3)$$

$$\text{for } k = N+1,\ldots,N+C$$

Provided all the hardware is working without fault, the outputs of the checksum processors should be the same weighted linear combination of the first N processor outputs. Thus the error syndromes $s_k[n]$, defined by:

$$s_k[n] = y_k[n] - \sum_{m=1}^{N} w_{k,m} y_m[n] \qquad (4)$$

$$\text{for } k = N+1,\ldots,N+C$$

should all be zero.

Syndrome Behavior Given Processor Errors

We will assume that the data distribution network and the correction system always operate correctly. We therefore limit our attention to three different possible sources of error. First of all, one or more of the input checksum calculations could have error $\delta_k[n]$:

$$x_k[n] = \sum_{m=1}^{N} w_{k,m} x_m[n] + \delta_k[n] \qquad (5)$$

$$\text{for } k = N+1,\ldots,N+C$$

One or more processors in (1) and (3) might have failed, with error $\epsilon_k[n]$:

$$y_k[n] = Fx_k[n] + \epsilon_k[n] \text{ for } k=1,\ldots,N+C \qquad (6)$$

Finally, one or more syndrome computations (4) may have failed, introducing error $\lambda_k[n]$:

$$s_k[n] = y_k[n] - \sum_{m=1}^{N} w_{k,m} y_m[n] + \lambda_k[n] \quad (7)$$

for $k = N+1, \ldots, N+C$

Putting all this together:

$$s_k[n] = F\delta_k[n] + \epsilon_k[n] - \sum_{m=1}^{N} w_{k,m}\epsilon_m[n] + \lambda_k[n] \quad (8)$$

for $k=N+1, \ldots, N+C$. It is convenient to define this in block matrix form. First of all, we will lump together failures in each checksum processor with failures in its input and output checksum computations, and will not try to distinguish between these. Define composite errors:

$$\phi_k[n] = \begin{cases} \epsilon_k[n] & \text{for } k = 1, \ldots, N \\ \epsilon_k[n] + F\delta_k[n] + \lambda_k[n] & \text{for } k = N+1, \ldots, N+C \end{cases} \quad (9)$$

Define block vectors:

$$s[n] = \begin{pmatrix} s_{N+1}[n] \\ \vdots \\ s_{N+C}[n] \end{pmatrix} \quad \phi_n[n] = \begin{pmatrix} \phi_1[n] \\ \vdots \\ \phi_{N+C}[n] \end{pmatrix} \quad (10)$$

Also define a $Cq \times (N+C)q$ block weighting matrix W, where each block is a weighted multiple of a qxq identity matrix:

$$W = \begin{bmatrix} w_{N+1,1}I & \cdots & w_{N+1,N}I & -I & 0 & \cdots & 0 \\ \cdots & \cdots & \cdots & \cdots & \cdots & \cdots & \cdots \\ w_{N+C,1}I & \cdots & w_{N+C,N}I & 0 & \cdots & 0 & -I \end{bmatrix} \quad (11)$$

The notation will be simplified if we also define weights corresponding to the rightmost C block columns of this matrix as follows:

$$w_{N+i,N+j} = \begin{cases} -1 & \text{for } i = j = 1, \ldots, C \\ 0 & \text{for } i \neq j \end{cases} \quad (12)$$

Putting all this together, in case of failure the syndromes will have the value:

$$s[n] = -W\phi[n] \quad (13)$$

Detecting Processor Failure

Now suppose that only one of the N+C processor or checksum modules, k, has failed, with error $\phi_k[n]$. Let $W_k$ represent the $k^{th}$ block column of W. Then the syndromes will be:

$$s[n] = -W_k\phi_k[n] \quad (14)$$

Each syndrome $s_m[n]$ is proportional to $\phi_k[n]$, but with relative gain $w_{m,k}$ determined by the $k^{th}$ block column of W. Given s[n], we will be able to distinguish a processor $k_1$ failure from a processor $k_2$ failure provided that block columns $k_1$ and $k_2$ of W are linearly independent. This notion can be generalized. Suppose our goal is to be able to reliably detect whether up to $K_m+L_m$ processors have failed, and to correct their errors if only $K_m$ or fewer have failed. It can be shown that this is possible if and only if $C \geq 2K_m+L_m$, and every set of $2K_m+L_m$ block columns of the matrix W is linearly independent. To detect a single failure requires at least one checksum processor, to detect and correct a single failure requires at least two checksum processors. Triple modular redundancy can be viewed as a special case of this theory for N=1 working processor and C=2 checksum processors, all working on exactly the same data with weight matrix:

$$W = \begin{bmatrix} I & -I & 0 \\ I & 0 & -I \end{bmatrix} \quad (15)$$

Graphical Interpretation

Figure 3:
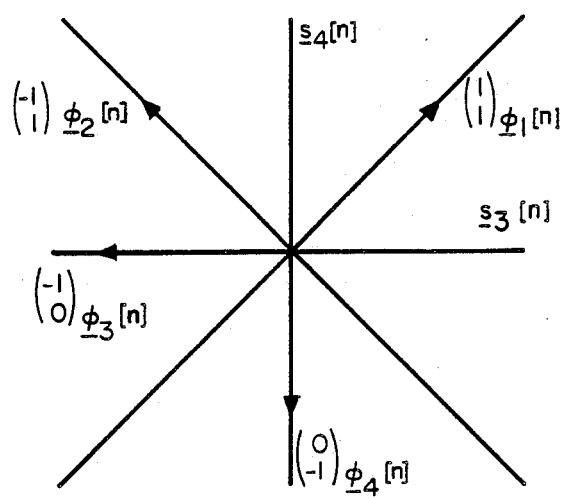
FIG. 3 is a graphical description of the error syndrome structure according to the invention.

Mechanisms for correcting faulty processors are most easily described via a graphical description of the error syndrome structure. Suppose there are two checksum processors, C=2. If a single processor k fails and we plot matching components of the syndrome vectors, $s_{N+1}[n]$ and $s_{N+2}[n]$, then we will get a point proportional to the vector $(w_{N+1,k}, w_{N+2,k})$, (FIG. 3). If each of these N+2 weight vectors defines a distinct line, then any single error can be identified simply by plotting the syndromes and noting which line they fall on. Furthermore, the size of the error $\phi_k[n]$ is proportional to the size of the syndromes.

If two errors occur in processors $k_1$ and $k_2$, then the syndromes will be somewhere in the plane defined by vectors $(w_{N+1,k1}, w_{N+2,k1})$ and $(w_{N+1,k2}, w_{N+2,k2})$. Provided these vectors are never colinear, the resulting syndromes can never be at the origin. Thus we will be able to detect that 2 failures have occurred. However, since many different combinations of two of the weight vectors could explain any syndrome in two-dimensions, we will not be able to identify which processors failed. Also, since a 2 processor failure can lead to a syndrome which accidently lies exactly on a different weight vector line, it is impossible to reliably distinguish a 1 processor error from a 2 processor error with only C=2 checksum processors.

If three simultaneous errors occur, then it is possible (though unlikely) that the weighted sum of the three corresponding weight vectors may add to zero, thus disguising the fact that a fault occurred. Thus we cannot reliably detect when three or more errors occur.

More generally, given C checksum processors, we can imagine plotting components of the syndromes in C-dimensional space. Let each of the N+C columns of the weight matrix W define a weight vector $(w_{N+1,k} \cdots w_{N+C,k})^T$ in this space. With K errors in processors $k_1, \ldots, k_K$, the syndrome should fall in the hyperplane defined by weight vectors $k_1, \ldots, k_K$. If our goal is to be able to correct K errors, then no two such hyperplanes can intersect. Otherwise, any syndrome falling on the intersection could be equally well explained by two different sets of processor failures. Avoiding such hyperplane intersections, however, is only possible if $C \geq 2K$.

Optimal Detection/Correction Strategy

If the checksums are computed using integer arithmetic and the processors use integer arithmetic with no rounding or truncation, then the syndrome calculations would be exact. For this case, it is easy to find quick tests for identifying which weight vector line contains the syndrome, and for exactly fixing the failure. Unfortunately, most processors rely on conventional fixed-point or floating-point arithmetic, and they therefore introduce truncation and rounding errors. Even if no processors fail, the syndromes will deviate somewhat from zero. The issue is to try to choose the most likely explanation for the syndromes, separating out small numerical errors from large hardware errors, and correctly assigning the blame. Care is also needed to minimize the noise in any correction applied to the failed unit.

An optimal approach to minimizing the distortions introduced by numerical noise must exploit a model of the computational noise process. One approach is to compute the maximum possible computational errors. If the syndromes are larger than this, then a hardware failure must have occurred. Unfortunately, this approach can only detect and correct extremely large hardware-related errors. A more reasonable approach is to model the computational noise as a Gaussian process, and then design an optimal fault detection and correction procedure on the basis of a generalized likelihood ratio hypothesis test. In the following sections, we will focus on the case of detecting and/or correcting a single processor failure. We will later generalize the technique to $K_m + L_m$ failures.

We start with an a priori failure model. Let $H_k$ represent the hypothesis that processor $k$ has failed. For $k = N+1, \ldots, N+C$, we let $H_k$ represent a failure in either the checksum calculation, the checksum processor, or the syndrome calculation. Let $H_0$ represent the hypothesis that no processors have failed. It is reasonable to assume that each processor has an independent probability $P_k$ of failing and $(1-P_k)$ of working, and that these failure probabilities do not depend on the data flowing through the processors. For $k = N+1, \ldots, N+C$, we let $P_k$ represent the combined probability of failure of the checksum processor and the input and output checksum calculators. Thus the a priori probability of hypothesis $H_k$ is:

$$p(H_0) = \prod_{m=1}^{N+C} (1 - P_m) \qquad (16)$$

$$p(H_k | \phi_k) = P_k \prod_{\substack{m=1 \\ m \neq k}}^{N+C} (1 - P_m)$$

Note that the magnitude of $P_k$ implicitly depends on various parameters of the problem being solved, particularly the size of each batch, p or q, since the time spent computing grows with the size.

Next we need a model for how the processor and syndrome outputs are supposed to behave under each failure hypothesis. Under $H_0$, we will model the input checksum noise, $\delta_k[n]$, the processor noise, $\epsilon_k[n]$, and the syndrome computation noise, $\lambda_k[n]$, as independent, zero-mean Gaussian random variables with variances $\Delta_k$, $\Gamma_k$, and $\Lambda_k$, respectively. From equation (9), the composite errors $\phi_k[n]$ will be zero-mean Gaussian random variables:

$$p(\phi_k[n] | H_0) = N(0, \Phi_k) \qquad (17)$$

with variance $\Phi_k$ given by:

$$\Phi_k = \begin{cases} \Gamma_k & \text{for } k = 1, \ldots, N \\ \Gamma_k + F\Delta_k F^T + \Lambda_k & \text{for } k = N+1, \ldots, N+C \end{cases} \qquad (18)$$

Let $\Phi$ be the $(N+C)q \times (N+C)q$ block diagonal matrix with diagonal blocks $\Phi_k$.

Now for the density of the processor outputs and syndromes. For convenience, let us define $\bar{y}_m[n] = F x_m[n]$ as the unknown correct value of the processor output. Let $y[n]$ and $\bar{y}[n]$ be the $Nq$ length block vectors:

$$y[n] = \begin{pmatrix} y_1[n] \\ \vdots \\ y_N[n] \end{pmatrix} \quad \bar{y}[n] = \begin{pmatrix} \bar{y}_1[n] \\ \vdots \\ \bar{y}_N[n] \end{pmatrix} \qquad (19)$$

Then combining (5), (6), and (7):

$$\begin{pmatrix} y[n] \\ s[n] \end{pmatrix} = \begin{pmatrix} \bar{y}[n] \\ 0 \end{pmatrix} + \begin{pmatrix} I & 0 \\ & -W \end{pmatrix} \phi[n] \qquad (20)$$

Under $H_0$, the joint distribution of the processor outputs $y[n]$ and syndromes $s[n]$ is thus:

$$p\left(\begin{pmatrix} y[n] \\ s[n] \end{pmatrix} \bigg| H_0, \bar{y}[n]\right) = N\left(\begin{pmatrix} \bar{y}[n] \\ 0 \end{pmatrix}, \begin{pmatrix} I & 0 \\ & -W \end{pmatrix} \Phi \begin{pmatrix} I & 0 \\ 0 & -W^T \end{pmatrix}\right) \qquad (21)$$

Integrating over $y[n]$ gives the probability density for the syndromes:

$$p(s[n] | H_0) = N(0, V) \qquad (22)$$

where $V$ is the variance of $s[n]$:

$$V = W\Phi W^T = \sum_{m=1}^{N+C} W_m \Phi_m W_m^T \qquad (23)$$

If a transient or permanent processor failure occurs, then our model must be modified accordingly. Unfortunately, no single model can conceivably cover every possible failure mode of a processor. To simplify the analysis, we will assume that the hypothesis $H_k$ implies that the error $\phi_k[n]$ behaves like a Gaussian random variable with non-zero mean $\bar{\phi}_k[n]$ and covariance $\bar{\Phi}_k$:

$$p(\phi_k[n] | H_k, \bar{\phi}_k[n]) = N(\bar{\phi}_k[n], \bar{\Phi}_k) \qquad (24)$$

The mean $\bar{\phi}_k[n]$ is assumed to be unknown, and must be estimated from the observations. The covariance $\bar{\Phi}_k$, however, is assumed to be known. (Although this assumption is unrealistic, the value of $\bar{\Phi}_k$ actually does not affect the form of our fault detection/correction algorithm, and only affects some thresholds.) We assume that the other processors continue to work correctly, generating the usual computational noise. Equation 20 still relates y[n] and s[n] to $\phi[n]$. Therefore, the joint distribution of y[n] and s[n] given $\overline{\phi}_k[n]$ under hypotehsis $H_k$ is:

$$p\left(\binom{y[n]}{s[n]}\Big|H_k, y[n], \phi_k[n]\right) = N\left(\binom{y[n]}{0}\right) + \binom{I_k}{-W_k}\phi_k[n], \binom{I\ 0}{-W}\Phi\binom{I\ -W^T}{0}\right) \quad (25)$$

where $I_k$ is the Nqxq matrix which is the $k^{th}$ block column of I for k=1, ..., N, and is zero for k=N+1, ..., N+C. Also $\overline{\phi}$ equals $\phi$ but with diagonal element $\phi_k$ replaced by $\phi_k$. Note that the distribution now depends on the mean and variance of the failed processor's output. Integrating over y[n] gives the probability density for the syndromes:

$$p(s[n]|H_k, y[n], \phi_k[n]) = \quad (26)$$

$$N\left(-W_k\phi_k[n], \sum_{\substack{m=1 \\ m\neq k}}^{N+C} W_m\Phi_m W_m^T + W_k\Phi_k W_k^T\right) =$$

$$N(-W_k\phi_k[n], V - W_k\Delta\Phi_k W_k^T)$$

where $\Delta\phi_k = \phi_k - \overline{\phi}_k$ is the difference between the $k^{th}$ processor's working and failure covariance.

Generalized Likelihood Ratio Test

We will use a Generalized Likelihood Ratio Test (GLRT) to compute the a posteriori most likely failures and computational errors to explain the syndromes s[n]. Constructing this test is complicated by the fact that the "correct" processor outputs $\bar{y}_m[n]$ and the processor failure $\overline{\phi}_k[n]$ are not known, and must be inferred from the available noisy, and possibly faulty outputs. These uncertainties lead to several different approaches to constructing a GLRT. Happily most of these approaches give quite similar fault detection/correction algorithms, and they differ primarily in the values of some thresholds.

The simplest GLRT approach examines the joint probability of the syndromes and hypothesis $H_k$ given the most likely value of the failed processor error. It then chooses the hypothesis with the greatest likelihood. The corresponding estimate of the failed processor's error can be used to reconstruct the failed output.

In more detail, this approach is as follows. Let us define $L_k[n]$ as the log likelihood of the syndromes s[n] and hypothesis $H_k$; for k=1, ..., N+C, this density is conditioned on the most likely value of the mean of the failed processor $\overline{\phi}_k[n]$:

$$L_0 = \log p(s[n], H_0) \quad (27)$$

$$L_k[n] = \max_{\phi_k} \log p(s[n], H_k|\phi_k[n]) \text{ for } k = 1, ..., N+C$$

Let $\hat{\phi}_k[n]$ represent the value which maximizes the $k^{th}$ likelihood. Surprisingly, after using Bayes' Rule, substituting Gaussian densities into these likelihood formulas and applying a substantial amount of algebra, we can show that this procedure is precisely equivalent to a straightforward projection algorithm of the following form. Define a $V^{-1}$ norm as:

$$\|v\|_{V^{-1}}^2 = v^T V^{-1} v \quad (28)$$

For each hypothesis $H_k$ for k=1, ..., N+C, we first estimate the error made by the $k^{th}$ processor or syndrome calculator by computing the projection of s[n] onto the $-W_k$ direction with respect to the $V^{-1}$ norm:

$$\phi_k[n] \leftarrow \min_{\phi_k[n]} \|s[n] + W_k\phi_k[n]\|_{V^{-1}}^2 \quad (29)$$

or equivalently:

$$\phi_k[n] = -[W_k^T V^{-1} W_k]^{-1} W_k^T V^{-1} s[n] \quad (30)$$

for k = 1, ..., N + C

Substituting these optimal estimates into the log likelihoods $L_k[n]$, we can show that $L_k[n]$ is just the distance of s[n] to the projection $-W_k\hat{\phi}_k[n]$, plus a constant term which does not depend on s[n]:

$$L_0[n] = -\frac{1}{2} \|s[n]\|_{V^{-1}}^2 + \gamma_0 \quad (31)$$

$$L_k[n] = -\frac{1}{2} \|s[n] + W_k\phi_k[n]\|_{V^{-1}}^2 + \gamma_k$$

for $k = 1, ..., N + C$ where the $\gamma_k$ are various constants. Somewhat simpler formulas result if we consider the relative likelihood $L'_k[n]$ of hypothesis $H_k$ relative to $H_0$, defined by:

$$L'_k[n] = 2(L_k[n] - L_0[n]) \quad (32)$$

(the factor of 2 is for convenience). Then:

$$L'_0[n] = 0 \quad (33)$$

$$L_k'[n] = \|W_k\phi_k[n]\|_{V^{-1}}^2 + \gamma_k'$$

for $k = 1, ..., N + C$

The relative likelihoods can thus be interpreted as being equal to the $V^{-1}$ weighted energy in the projection $W_k\hat{\phi}_k[n]$ plus a constant $\gamma_k$ with value:

$$\gamma_k' = -\log|I - W_k^T V^{-1} W_k \Delta\Phi_k| + 2\log\left(\frac{P_k}{1-P_k}\right) \quad (34)$$

where $\Delta\phi_k = \phi_k - \overline{\phi}_k$ is the difference between the $k^{th}$ processor's working and failure noise variance. In effect, this likelihood ratio test chooses to believe that a fault has occurred only if the syndrome energy is so large, relative to the computational noise, that the probability of the error is smaller than the probability of a failure.

To summarize, the optimal signal fault detection/correction algorithm computes (30), the projection $\hat{\phi}_k[n]$ of s[n] onto each weight vector, k=1, ..., N+C. It then evaluates (33), the relative likelihoods $L'_k[n]$ for k=0, ..., N+C. Choose the largest $L'_k[n]$; if k>0, then we conclude that processor k has most likely failed. If k is in the range 1, ..., N, then our best estimate of the "correct" processor output $\hat{y}_k[n]$ is given by:

$$\hat{y}_k[n] = y[n] - \hat{\phi}_k[n] \tag{35}$$

Figure 4:
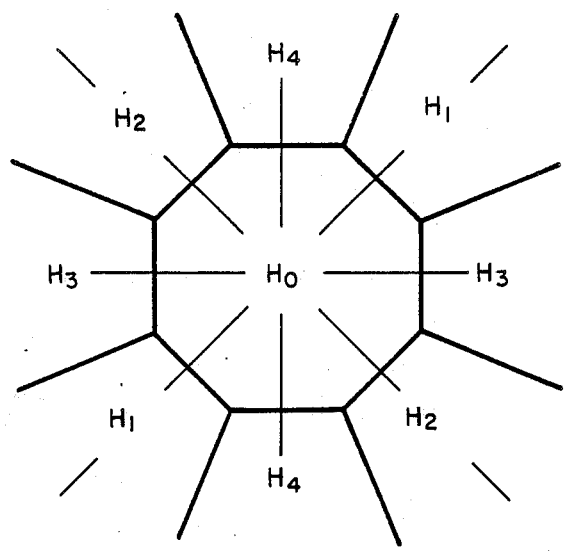
FIG. 4 is a graphical depiction of the decision region partitions for the weight vectors of FIG. 3.

In effect, this strategy partitions the Cq dimensional space of syndromes s[n] into a set of decision regions, each corresponding to a different conclusion about which processor has failed. The region corresponding to $H_0$ forms a polyhedral neighborhood centered on the origin. The regions corresponding to hypotheses $H_k$ are pie-shaped slices which hug the line corresponding to that processor's weight vector. FIG. 4 shows the decision region partitions for the weight vectors of FIG. 3 with C=2 and single fault correction. To correct the identified faulty processor, we use the projection of the syndromes onto the corresponding weight vector.

Estimating the Working Processor's Correct Values

An unfortunate feature of the preceding scheme is that the extra checksum processors are dedicated exclusively to detecting and correcting faults, and their computation serves no other useful purpose. It is interesting to note that the syndromes can also be used to help filter out some of the computational noise on the working processors. Intuitively, with C extra processors, we should be able to reduce the variance of the processor outputs by about a factor of C/(N+C). To show how to do this, we will use a somewhat different Generalized Likelihood Ratio Test. This time, we use all the available information, the syndromes and the N normal processor outputs, to estimate not only the failure hypothesis, but also all the "correct" noise and failure-free outputs. In this approach, we define $L_k[n]$ as the log likelihood of hypothesis $H_k$ together with all the processor syndrome outputs y[n] and s[n], given the most likely estimates of all the "correct" outputs $\bar{y}[n]$ and the mean of the failed processor's error $\bar{\phi}_k[n]$ (if any):

$$L_0[n] = \max_{y} \log p(y[n], s[n], H_0 | y[n]) \tag{36}$$

$$L_k[n] = \max_{y} \max_{\phi_k} \log p(y[n], s[n], H_k | y[n], \phi_k[n])$$

Let $\hat{\bar{y}}[n]$ and $\hat{\bar{\phi}}_k[n]$ represent the values of $\bar{y}[n]$ and $\bar{\phi}_k[n]$ at which the maximum is achieved. (This value is different for each $H_k$.) The value of $\hat{y}[n]$ can be viewed as a "clean" estimate of the "correct" processor outputs, derived by using both the actual outputs and the syndromes. To solve for these maxima, we apply Bayes' Rule, then substitute the Gaussian formulas (16), (21), and (25). Under $H_0$ with no processor failures, the maximum over $\bar{y}[n]$ is achieved at:

$$y_m[n] = y_m[n] + \Phi_m W_m^T V^{-1} s[n] \tag{37}$$

for $m = 1, \ldots, N$ while under hypothesis $H_k$ for k=1, ..., N+C:

$$y_m[n] = \begin{cases} y_m[n] + \Phi_m W_m^T V^{-1} (s[n] + W_k \phi_k[n]) & \text{for } m = 1, \ldots, N, m \neq k \\ y_k[n] - \phi_k[n] & \text{for } m = k, (1 \leq m \leq N) \end{cases} \tag{38}$$

where $\hat{\phi}_k[n]$ is exactly the same estimate of the failed processor's error as in our previous method, (30). Note that these estimates are formed by starting with the observed processor output, then adding a term depending on the syndromes which cancels out some of the computational noise.

Substituting these values back into the log likelihoods and computing relative likelihoods $L'_k[n] = 2(L_k[n] - L_0[n])$ as before, we find the surprising result that the log likelihoods have exactly the same values (33) as in our previous approach, except that the values of the constants are different:

$$\gamma_k' = -\log|\Phi_k \Phi_k^{-1}| + 2\log\left(\frac{P_k}{1 - P_k}\right) \tag{39}$$

Thus the GLRT test operates exactly as before, projecting the syndromes onto each weight vector to compute $\hat{\phi}_k[n]$, then computing the log likelihoods from (33) as the energy in this projection plus a constant $\gamma'_k$. As before, the largest likelihood indicates the most likely failure hypothesis. The added feature of this new algorithm is that we not only get an estimate of the size of the failed processor's error, $\hat{\phi}_k[n]$, but also some of the computational noise corrupting the working processors' outputs is removed to form the cleaner output estimates $\hat{y}[n]$ in (37), (38).

Special Case—White Computation Noise

In some cases, under hypothesis $H_0$, the syndromes s[n] will behave like white Gaussian noise, with a covariance matrix V which is exactly or approximately a scaled identity matrix. Under these circumstances our fault detection/correction algorithm is particularly efficient. In this section we derive the circumstances under which the syndromes have this property, and present fast algorithms for computing the fault corrections. Examples of weight vectors satisfying the requirements listed in this section are presented below.

One circumstance under which the syndromes will be white Gaussian noise is if all sources of computational error are white:

$$\Gamma_k = \sigma_\Gamma^2 I \quad \Delta_k = \sigma_\Delta^2 I \quad \Lambda_k = \sigma_\Lambda^2 I \tag{40}$$

if F is an orthogonal transform:

$$FF^T = \sigma_F^2 I \tag{41}$$

and if W satisfies:

$$WW^T = \sigma_W^2 I \tag{42}$$

In this simple case, V has the form:

$$V = \sigma_v^2 I \text{ where } \sigma_v^2 = \sigma_W^2 \sigma_\Gamma^2 + \sigma_F^2 \sigma_\Delta^2 + \sigma_\Lambda^2 \tag{43}$$

and $\Phi_k$ has the form:

$$\Phi_k = \sigma_k^2 I \text{ where } \sigma_k^2 = \tag{44}$$

-continued $$\begin{cases} \sigma_T^2 & \text{for } k = 1, \ldots, N \\ \sigma_T^2 + \sigma_F^2 \sigma_\Lambda^2 + \sigma_\Lambda^2 & \text{for } k = N+1, \ldots, N+C \end{cases}$$

We will also assume that the variance of a failed processor is still white:

$$\Phi_k = \sigma_k^2 I \qquad (45)$$

For convenience, let us define $r_{km}$ as the cross-correlation between the $k^{th}$ and $m^{th}$ weight vectors:

$$r_{km} = \sum_{l=N+1}^{N+C} w_{l,k} w_{l,m} \qquad (46)$$

Then the relative likelihoods have values:

$$L'_k[n] = \frac{1}{r_{kk}\sigma_v^2} \sum_{l=N+1}^{N+C} \sum_{m=N+1}^{N+C} w_{l,k} w_{m,k} s_l^T[n] s_m[n] + \gamma'_k \qquad (47)$$

These can be computed with minimum effort by the following algorithm:

Detect/Correct Algorithm #1

$L'_0[n] = 0$
For $l = N+1, \ldots, N+C$:
 For $m = 1, \ldots, N+C$:

$$\rho_{l,m}[n] = \frac{1}{\sigma_v^2} s_l^T[n] s_m[n]$$

For $k = 1, \ldots, N$:

$$L'_k[n] = \frac{1}{r_{kk}} (w_{N+1,k} \cdots w_{N+C,k}) \begin{bmatrix} \rho_{N+1,N+1}[n] & \cdots & \rho_{N+1,N+C}[n] \\ \vdots & \cdots & \vdots \\ \rho_{N+C,N+1}[n] & \cdots & \rho_{N+C,N+C}[n] \end{bmatrix} \begin{pmatrix} w_{N+1,k} \\ \vdots \\ w_{N+C,k} \end{pmatrix} + \gamma'_k$$

For $k = N+1, \ldots, N+C$ $$L'_k[n] = \frac{1}{r_{kk}} \rho_{k,k}[n] + \gamma'_k$$

Choose the largest $L'_k[n]$. If $1 \leq k \leq N$, then the corrected output from processor k is:

$$y_k[n] = y_k[n] + \frac{1}{r_{kk}} \sum_{m=N+1}^{N+C} w_{m,k} s_m[n]$$

The constants $\gamma'_k$ in the above formula have values:

$$\gamma'_k = -q \log\left(1 - \frac{(\sigma_k^2 - \sigma_k^2)}{\sigma_v^2} r_{kk}\right) + 2 \log\left(\frac{P_k}{1 - P_k}\right) \qquad (48)$$

for our original method, and values:

$$\gamma'_k = -q \log\left(\frac{\sigma_k^2}{\sigma_k^2}\right) + 2 \log\left(\frac{P_k}{1 - P_k}\right) \qquad (49)$$

for our alternate method.

In all, about $C(C+1)q/2$ multiply/adds are required to compute the $\rho_{l,m}[n]$, about $(C+1)CN/2$ multiply adds to calculate the relative likelihoods, and about $Cq$ multiply/adds to fix the failed processor. To compute the total overhead required for this algorithm, let $T(p,q)$ be the number of multiply/adds required to compute F. Assume that the likelihood calculation system is triplicated so that its reliability matches that of the rest of the system. The ratio of computation due to fault checking overhead to that due to processing data on the N working processors, $NT(p,q)$, is thus:

$$\frac{C}{N} + \frac{C(p+q)}{T(p,q)} + 3\left[\frac{(C+1)C(q+N)/2}{NT(p,q)} + \frac{Cq}{NT(p,q)}\right] \qquad (50)$$

The first term reflects the fact that C extra processors are used to check N working processors. The second term reflects the checksum and syndrome computation overhead. The third term reflects the work involved in computing the $(N+C+1)$ likelihoods in triplicate and computing the correction to the failed processor.

If our goal is to use the syndromes not only for fault detection and correction, but also to filter some computational noise from the working processor outputs, then it is worthwhile to rearrange the computation somewhat. The same likelihoods $L'_k[n]$ are calculated as before, but using the following algorithm:

Detection/Correction/Filtering Algorithm #2

For $k = 1, \ldots, N$:

$$\tau_k[n] = \sum_{m=N+1}^{N+C} w_{m,k} s[n]$$

$$\phi_k[n] = -\frac{1}{r_{kk}} \tau_k[n]$$

$$L_k'[n] = -\frac{1}{\sigma_v^2} \tau_k^T[n] \phi_k[n] + \gamma_k$$

For $k = N+1, \ldots, N+C$:

$$\tau_k[n] = s_k[n], \quad \phi_k[n] = -s_k[n]$$

$$L_k'[n] = \frac{1}{\sigma_v^2} s_k^T[n] s_k[n] + \gamma_k'$$

Choose the hypothesis with the largest $L'_k[n]$. If $H_0$ is most likely, then:

$$y_m[n] = y_m[n] + \frac{\sigma_m^2}{\sigma_{\nu}^2} \tau_m[n] \text{ for } m = 1, \ldots, N$$

Otherwise, if $H_k$ is most likely, compute the corrections to the outputs as follows:

$$y_m[n] = \begin{cases} y_m[n] + \frac{\sigma_m^2}{\sigma_{\nu}^2} (\tau_m[n] + r_{mk}\phi_k[n]) & \text{for } m \neq k \\ y_k[n] - \phi_k[n] & \text{else} \end{cases}$$

For this algorithm, about NCq multiply/adds are required to compute the $\tau_k[n]$ and $\phi_k[n]$, about (N+C)q multiply/adds to compute the relative likelihoods, about Cq to fix the failed processor, and about 2(N−1)q more to filter computational noise from the working processors. The overhead ratio is thus:

$$\frac{C}{N} + \frac{C(p+q)}{T(p,q)} + 3\left[\frac{(N+1)(C+1)q}{NT(p,q)} + \frac{2(N-1)q}{NT(p,q)}\right] \quad (51)$$

Special Case—Single Fault Detect, C=1

Suppose that a single checksum processor is used for single fault detection, C=1, and that all weights $w_{N+1,k}$ are non-zero. Then the optimal single fault detection algorithm simplifies drastically to a simple syndrome energy test:

$$\text{If } s_{N+1}^T[n]V^{-1}s_{N+1}[n] > \gamma \text{ then FAILURE} \quad (52)$$

where:

$$\gamma = - \max_{k=1,\ldots,N+C} \gamma'_k \quad (53)$$

Typically, the $\gamma'_{N+1}$ constant is the largest because the combination of the checksum, checksum processing, and syndrome computation, yields the largest computational error and the highest probability of failure. If the decision is that there is no failure, then the estimated correct processor outputs are:

$$y_m[n] = y_m[n] + \quad (54)$$
$$w_{N+1,m}\Phi_m V^{-1}s_{N+1}[n] \text{ for } m = 1, \ldots, N$$

If the decision is that there is an error, then no correction of the outputs is possible with only 1 checksum processor, and we set:

$$y_m[n] = y_m[n] \quad \text{for } m = 1, \ldots, N \quad (55)$$

If the syndromes are white Gaussian noise, so that V and $\Phi_m$ are all scaled identity matrices, then the overhead ratio to detect a fault is:

$$\frac{1}{N} + \frac{p+q}{T(p,q)} + 3\left[\frac{q}{NT(p,q)}\right] \quad (56)$$

Reliability—Gross Errors

There are three major sources of error in this fault detection and correction scheme. The first of these is that our scheme will yield meaningless corrections if 2 or more faults occur simultaneously. Let us assume for convenience that processor failures are independent of each other, and happen with probability $P_f \ll 1$. Let us also assume that the data input distribution system is triplicated, and that each copy has probability $P_I \ll 1$ of failing. Finally, let us assume that the likelihood computation and output correction unit is also triplicated, and that each copy has probability $P_{DC} \ll 1$ of failing. We say that a "system failure" has occurred if two processors fail simultaneously, or if two input distribution units fail, or if two GLRT calculators fail. The total probability of such a "system failure" in a single error detection or correction system is then approximately:

$$\text{Prob}(>1 \text{ failure}) \approx \frac{(N+C)(N+C-1)}{2} P_f^2 = 3P_I^2 + 3P_{DC}^2 \quad (57)$$

This should be compared with a Triple Modular Redundancy (TMR) system using N triples of processors to process the same input data stream. In this case, if each individual processor has the same probability of failure $P_f$, then the system will fail if and only if 2 or more processors fail in one or more triples. The probability of this happening is approximately:

$$\text{Prob}(>1 \text{ failure in any triple}) = 3NP_f^2 \quad (58)$$

Our method has approximately (N+2C)/6 times more probability of system failure than TMR. On the other hand, our method uses only N+C processors while TMR uses 3N processors. In both cases, the reliability can be greatly improved by quickly replacing consistently faulty processors with working spares (although the mechanism for doing this might introduce additional reliability problems).

Probability of Misdiagnosis

The second source of error is that the likelihood ratio test which selects the most likely failure hypothesis may occasionally make mistakes due to the random nature of the computational noise. If the hardware error were small, then we might mistakenly conclude that no error occurred. For example, if the least significant bit of a processor is stuck, then almost surely it will not be corrected. Similarly, unusually large computational noise might be mistakenly interpreted as a hardware failure on some processor. Another type of error is if a hardware failure occurs, but computational noise pushes the syndromes closer to the wrong weight vector line, and into the wrong decision region. In this case, the algorithm will guess the wrong processor as having failed, and the output corrections will be completely wrong. Once again, this type of error is most likely if the hardware error was small.

The probability of making the right decision is easy to state analytically, although it is difficult to calculate. Suppose that processor k has failed, and the mean of its error is $\bar{\phi}_k[n]$. Let $H_m$ represent the set of all syndromes $s[n]$ which fall into the $m^{th}$ decision region, and which will therefore be classified as a failure on processor m. The probability of a failure on processor k being classified as a failure on processor m is then:

$$\text{Prob(Guess } H_m | H_k \text{ is correct)} = \int_{H_m} p(s[n]|H_k, \phi_k[n])ds \quad (59)$$

Unfortunately, this integral is rather difficult to evaluate.

There is a different and much simpler approach, which is not as precise as that above, but which nevertheless gives useful insight into how the probability of misdiagnosis behaves. The key idea is that the relative likelihoods $L'_k[n]$ are functions of the syndromes, and therefore behave like random variables. For each hypothesis $H_k$ and each error $\overline{\phi}_k[n]$ we can compute the mean and variance of these likelihoods. Ideally, if $H_0$ were true, then we would hope that all the relative likelihoods would be negative on average, so that we would correctly decide that no processors have failed. Similarly, if $H_k$ were true, then we would hope that $L'_k[n]$ would be substantially larger than the other $L'_m[n]$ so that we would correctly decide that processor k is failed. Analyzing the formulas for the means and variances for the relative likelihoods sheds light on how accurate our test will tend to be, and how it behaves as a function of the size of the failure, the choice of weight vectors, and the number of elements q.

Start by combining (30) and (33) to give the following formula for $L'_k[n]$:

$$L'_k[n] = s^T[n]V^{-1}W_k(W_k^TV^{-1}W_k)^{-1}W_k^TV^{-1}s[n] + \gamma'_k \quad (60)$$

Because the syndromes s[n] are random variables, each $L'_k[n]$ must also be a random variable. Its distribution will depend on whether any failures have occurred and on the size of the failure, if any. For maximum clarity, we will only present the formulas for the case where the syndromes behave like white Gaussian noise under $H_0$, as above. We will also omit the time index '[n]'. Now suppose that no processors have failed, so that $H_0$ is true. Then using (19) we can show:

$$E[L'_m|H_0] = q + \gamma_m \quad (61)$$

On the other hand, if $H_k$ is true for $k=1,\ldots,N+C$, and the $k^{th}$ processor has failed with error $\overline{\phi}_k$, then:

$$E[L'_m|H_k, \phi_k] = q + \gamma'_m + \frac{r_{mk}^2}{r_{mm}}\left(\frac{\|\phi_k\|^2 - q(\sigma_k^2 - \sigma_k^2)}{\sigma_v^2}\right) \quad (62)$$

where $\uparrow v \uparrow^2 + v^T v$ is the usual Euclidian norm. The covariances of $L'_m$ and $L'_p$ can also be computed under each hypothesis. We list here only the formula for $H_0$, since it is the easiest to interpret, and the others are quite messy:

$$Cov(L'_m, L'_p|H_0) = 2q\frac{r_{mp}^2}{r_{mm}r_{pp}} \quad (63)$$

(The covariances under the other hypotheses are somewhat smaller than this, and they depend on the size of the failed processor's error.)

Note that if $H_0$ is true, then the relative likelihoods will all tend to be negative provided that $q+Y'_m<0$ for $m=1,\ldots,N+C$. This will ensure, on average, that we correctly recognize that all processors are working when in fact no failures have occurred. Similarly, if $H_k$ is true and processor k has actually failed, then relative likelihood $L'_k$ will be largest provided that the size of the failure $\uparrow \overline{\phi}_k \uparrow^2$ is large. $L'_k$ will be substantially larger on average than the other likelihoods $L'_m$ for $m \neq k$, provided that the cross-correlations between different weight vectors are low, $r_{mk} \approx 0$. Thus choosing the weight vectors to be as orthogonal as possible, "spreading them out" to fill the available space, will help to reduce the probability of mistaking the different failure modes. Also, if we use more checksum processors than necessary, $C>2K_m+L_m$, then we will be able to "spread" the weight vectors through a larger dimensional space and thereby increase the angle between them. Finally, note that if the failure affects all the elements of $\overline{\phi}_k$, then the size of the third term on the right hand side of (62) will grow proportionally to q. Also, we would generally expect the failure rate $\log P_k$ to grow proportionally to q. Using (48) and (49), all the terms on the left hand side of (62) grow proportionally to q. We conclude that the expected value of the likelihoods tend to grow as $O(q)$. From (63), however, the standard deviation only grows as $O(\sqrt{q})$. Batching together larger amounts of data, q, for the checksum procedure therefore tends to improve the probability of correctly diagnosing a permanent failure.

It is important to note that the probability of misdiagnosis can be controlled by careful adjustment of the thresholds $\gamma'_k$. Increasing the $k^{th}$ threshold increases the chance that $L'_k$ will be largest, and therefore increases the size of the $k^{th}$ decision region. Uniformly increasing all the thresholds $Y'_k$ for $k=1,\ldots,N+C$ decreases the size of the $H_0$ decision region, and therefore increases the chance of concluding that some hardware failure has occurred. Careful analysis suggests that the values of the thresholds given by our two GLRT methods are not necessarily the most desirable. (In fact, neither set guarantees that $q+Y'_k$ are all negative). A more flexible approach is to follow the strategy of a Neymann-Pearson test, and adjust the thresholds to appropriately balance the various probabilities of correctly identifying each fault versus the probabilities of misdiagnosis.

Correction Errors

Yet another problem is that, even if the correct processor is identified as having failed, the correction that is made to its output is based on the syndromes, and is therefore corrupted by considerable computational noise. The filtered estimates of the working processor outputs are also subject to computational noise. Some understanding of the error in these estimates can be gained by computing their mean and variance under each hypothesis.

It is straightforward to show that the estimates of the correct processor outputs $\hat{y}[n]$ are unbiased under all hypotheses.

$$E[y_m[n]|H_0] = y_m[n]$$

$$E[y_m[n]|H_k, \phi_k[n]] = y_m[n] \quad \text{for } k = 1,\ldots,N+C \quad (64)$$

This is true if $y_m[n]$ corresponds to a failed processor whose output has been reconstructed from the syndromes, or if it corresponds to a working processor whose computational noise is being filtered out by using the syndromes.

Computing the covariances of the estimates is more difficult. To simplify the presentation, we define $R_{mp}$ as the weighted cross-correlation of the $m^{th}$ and $p^{th}$ weight vectors:

$$R_{mp} = W_m^T V^{-1} W_p \qquad (65)$$

With our Gaussian model, under hypothesis $H_k$ for $K=1,\ldots,N$, the variance of the estimate of the failed processor's output can be shown to be:

$$Var(y_k[n]|H_k, \phi_k[n]) = R_{kk}^{-1} - \Phi_k \qquad (66)$$

In general, this error is about $O((N+C)/C)$ times larger than what we would expect under $H_0$ if this processor were working correctly.

If the algorithm is used to filter computational noise from the working processor outputs, then we can compute the reduction in noise. Under hypothesis $H_0$, the covariance of the working processor output estimates can be shown to be:

$$Cov\left[\hat{y}_m[n], \hat{y}_p[n]|H_0\right] = \Phi_m \delta_{mp} - \Phi_m R_{mp} \Phi_p \qquad (67)$$

where $\delta_{mp}$ is the Kronecker delta function: $\delta_{mp}=1$ if $m=p$, and $=0$ if $m \neq p$. The first term above represents the covariance of the observed processor outputs when both are working. The second term above, therefore, represents the reduction in computational noise achieved by incorporating the information in the syndromes to estimate the correct processor outputs. In general, we would expect this second term to reduce the variance by about a factor of $C/(N+C)$.

Under hypothesis $H_k$ for $k=1,\ldots,N+C$, where a processor output or syndrome has failed, the covariance of the estimates of the working processor outputs can be shown to be:

$$Cov\left[\hat{y}_m[n], \hat{y}_p[n]|H_k, \phi_k[n]\right] = \qquad (68)$$

$$\Phi_m \delta_{mp} - \Phi_m[R_{mp} - R_{mk}R_{kk}^{-1}R_{kp}]\Phi_p$$

for $m,p \neq k$. The first term above represents the variance of the observed outputs of the working processors. The second term represents the reduction in computational noise due to using the syndromes. This reduction is less than that under $H_0$ because part of the syndrome information is used for estimating the output of the failed processor. For $k=1,\ldots,N$, the covariance between a working processor output estimate and a failed processor output estimate is:

$$Cov\left[\hat{y}_m[n], \hat{y}_k[n]|H_k, \phi_k[n]\right] = \Phi_m R_{mk} R_{kk}^{-1} \qquad (69)$$

for $m \neq k$.

Additional computational error, not shown in this formula, would be incurred in computing these corrections. The variance of the estimate of the failed processor's output $\hat{y}_k[n]$ would therefore be higher than that shown above. Also, whether or not it is actually worthwhile to compute the corrected processor outputs $y_m[n]$ will depend on whether the improvement in computational noise outweighs the additional computational noise incurred in computing the correction.

Transient versus Permanent Failures

An important issue in all coding schemes is how much data is "batched together" before coding. In general, increasing the number of data elements coded at one time improves the overall error performance. In our case, we have assumed that data arrives in batches of p elements, and is output in batches of q elements. Syndromes containing q elements are computed using the q elements output from every channel, and the fault detection/correction scheme uses the total energy in all q elements to make its failure decision. If a hardware failure has significantly affected all q elements in the syndromes, then the GLRT will most probably be able to distinguish which processor failed. In fact, the bigger that q gets, the more certainly our method will work correctly, since the expected value of the relative likelihoods grows proportionally to q, while the standard deviation grows proportionally to $\sqrt{q}$.

On the other hand, if the failure has only affected a single element of a single processor by a small amount, then the failure may be masked by the computational noise from the other q-1 elements. It will take a large transient error to perturb the total energy in the syndromes sufficiently to cross the detection threshold. Thus if our goal is to identify and correct transient failures, we should keep the size of each output batch, q, as small as possible. Unfortunately, this makes the GLRT more sensitive to noise, and increases the probability of misdiagnosing the failure and making a mistaken correction.

Because each element of the syndromes depends only on the corresponding element from the processor outputs, the user has substantial flexibility to trade off sensitivity to transient errors for reliability of fault diagnosis. For example, if detecting and correcting small transient errors is critical, then the size of each element of the syndromes may be individually checked against a threshold. If it exceeds the threshold, then the appropriate correction is applied to that element of the processor which is identified using this element of the syndrome. The advantage is that this method is highly sensitive to failures corrupting only a single element. On the other hand, the method might make different failure decisions on different elements from the same q-element batch.

At the other extreme, we could collect multiple batches of data, and process them all with one pass of the fault detection/correction algorithm. With B batches, the energy in a total of Bq syndrome elements would be analyzed to determine which processor, if any, has failed. Small but permanent failures will be identifiable in this way because the systematic error will accumulate, while the noise will average out. On the other hand, even large transient failures may be washed out by excessive averaging. In general, some experimentation may be necessary to find the appropriate batch size for a realistic application.

Choice of Weight Vectors

It is important to choose the weight vectors appropriately to minimize the numerical errors made in computing the checksums, to minimize the computational load, and to make the weight vectors as different from each other as possible. Choosing weights of the form $w_{k,m}=2^{km}$, as suggested by Huang and Abraham, leads to weight vectors which are non-uniformly distributed through the syndrome space, and the resulting checksum computations have difficult scaling and dynamic range problems. Much better choices for the weights would be small integers, or perhaps small positive or negative powers of 2. A good procedure is to start with the set of all C-element vectors with integer elements in the range $-M$ to $+L$. Because we need to correct any single error, no two weight vectors may be multiples of each other. Therefore, eliminate from this set the zero vector, and any vector which is a multiple of another.

If we choose weights with values 0, $+1$, then there are $N+C=(2^C-1)$ different weight vectors. For example, with one more checksum processor than necessary for single error correction, $C=3$, we would protect $N=4$ working processors, with the following $N+C=7$ weight vectors (listed as columns of the W matrix):

$$W = \begin{bmatrix} 1 & 1 & 0 & 1 & -1 & 0 & 0 \\ 1 & 0 & 1 & 1 & 0 & -1 & 0 \\ 0 & 1 & 1 & 1 & 0 & 0 & -1 \end{bmatrix} \quad (70)$$

If we choose weights in the range $-1, 0, +1$, then there are $N+C=(3^C-1)/2$ different weight vectors. With $C=3$, then we could protect $N=10$ processors with the following $N+C=13$ weight vectors:

$$W =$$

$$\begin{bmatrix} 1 & 1 & 0 & 0 & 1 & 1 & 1 & 1 & 1 & 1 & -1 & 0 & 0 \\ 1 & -1 & 1 & 1 & 0 & 0 & 1 & 1 & -1 & -1 & 0 & -1 & 0 \\ 0 & 0 & 1 & -1 & 1 & -1 & 1 & -1 & 1 & -1 & 0 & 0 & -1 \end{bmatrix}$$

If we were allowed to use weights in the range $-2$ to $+2$, then we could construct up to $N+C=(5^C-3^C)/2$ different weight vectors. For example, with $C=2$, we could protect up to $N=6$ working processors with the following weight vectors:

$$W = \begin{bmatrix} 1 & 1 & 1 & 1 & 2 & 2 & -1 & 0 \\ 1 & -1 & 2 & -2 & 1 & -1 & 0 & -1 \end{bmatrix} \quad (72)$$

For all three examples, no multiplication would be needed for the checksums syndromes, just shifts and adds. This would also simplify the computation of the relative likelihoods.

An interesting characteristic of weight matrices built from a symmetric range of integers, $-L$ to $+L$, is that they form "complete" sets of weight vectors. We define a "complete" set of weight vectors as follows: if $(a_1\ a_2 \ldots a_C)^T$ is a vector in the set, then every vector of the form $(\pm a_1\ \pm a_2 \ldots \pm a_C)^T$ must either be a weight vector, or else its negative must be a weight vector. Weight matrices W formed from complete sets of weight vectors have the property that $WW^T$ is a scaled identity matrix, $WW^T=\alpha_w^2 I$ for some $\alpha_w^2$. If the computational noises are all white, and the linear function F is orthogonal, then the syndrome variance V will be a multiple of an identity matrix, and the fault correction procedure will be particularly simple.

Yet another important point is that, with these choices of W, the "angle" $W_n^T V^{-1} W_m$ between different weight vectors is typically large. This helps to improve the probability of correctly diagnosing processor failures.

Complex Valued Arithmetic

Although we have developed these checksum and syndrome ideas for real data, they are easily extendable to complex arithmetic. The formulas remain virtually unchanged, except that all variables and matrices are complex, matrix transposes such as $W^T$ are replaced by matrix Hermitians $W^H$ (complex conjugate transposes), and the weights may be chosen to be complex.

An interesting consequence is that it is easier to find large sets of good complex-valued weight vectors, since they belong to a 2Cq dimensional space. For example, we could choose the weights to have the form $n+jm$, where n and m are small integers or small positive or negative powers of two. Once again, we would construct the set of all such weight vectors, then eliminate all vectors that were a (complex) multiple of another vector. For example, with the real and imaginary parts each taking values $-1$, 0, $+1$, there would be $N+C=(9^C-5^C)/4$ different weight vectors possible. With $C=2$ checksum processors, we could protect up to $N=12$ working processors with weight vectors corresponding to columns from the following weight matrix:

$$W = \begin{bmatrix} 1 & 1 & 1 & 1 & 1 & 1 & 1 & 1 & 1+j & 1+j & 1+j & 1+j & -1 & 0 \\ 1 & j & -1 & -j & 1+j & -1+j & -1-j & 1-j & 1 & j & -1 & -j & 0 & -1 \end{bmatrix} \quad (73)$$

Weight vectors constructed in this way form "complete complex" sets. The resulting weight matrix thus has the property that $WW^H=\sigma_w^2 I$, for some real scalar $\sigma_w^2>0$. If the computational noises were all complex and white, and the linear function F were orthogonal, so the $FF^H=\sigma_F^2 I$, for some real scalar $\sigma_F^2>0$, then the syndrome variance V would be a real multiple of an identity matrix, $V=\sigma_V^2 I$ with $\sigma_V^2>0$, and the fault correction procedure would as easy to implement as in the cases above.

Computational Overhead of the Optimal Method

Using weights with small integer values substantially reduces the computational burden of the fault detection/correction algorithm. To illustrate, suppose that we wish to compute complex-valued Fast Fourier Transforms (FFT's), using $N=10$ working processors and $C=3$ checksum processors to correct single failures. We will use the weight vectors in (71) with values $\pm 1$, 0 to simplify the computation of the checksums and syndromes. Because an FFT is an orthogonal computation, and the weight vectors form a complete set, the syndrome variance will be white. The fast algorithms above are thus optimal for this problem.

First, suppose we will only correct a failure, and not filter the working processor outputs. To compute the overhead ratio, note that a q/2 point complex FFT has $p=q$ real data elements, and requires $2q\log_2(q/2)$ real multiplies, and $3q\log_2(q)-q$ real adds. Adding up all the computations required in our system, not counting multiplies by $\pm 1$, $\pm 2$, or $\pm\frac{1}{2}$, and exploiting other straightforward simplifications, gives the following breakdown of work:

| Operation | Real Multiplies | Real Additions |
|---|---|---|
| Compute complex FFT | | |
| N = 10 working processors: | 10[2qlog$_2$(q/2)] | 10[3qlog$_2$(q)-q] |
| C = 3 checksum processors: | 3[2qlog$_2$(q/2)] | 3[3qlog$_2$(q)-q] |
| Input Checksums | 0 | 21q |
| Syndromes | 0 | 24q |
| Triplicated Computation: | | |
| Syndrome Correlation $\sigma\gamma^2\rho_{lm}[n]$ | 3[6q] | 3[6(q-1)] |
| Relative Likelihoods $\sigma\gamma^2 L_k'[n]$ | 3[4] | 3[35] |
| Choose largest likelihood | 0 | 3[12] |
| Correction of Failed Processor | 3[q] | 3[3q] |

Given that the fault detection/correction must be performed in triplicate, the ratio of the number of multiplies due to fault checking to those needed for data computation is approximately:

$$0.3 + \frac{21q + 12}{20q\log_2(q/2)}$$

and the ratio for additions is approximately:

$$0.3 + \frac{72q + 123}{30q\log_2 q - 10q}$$

Figure 5:
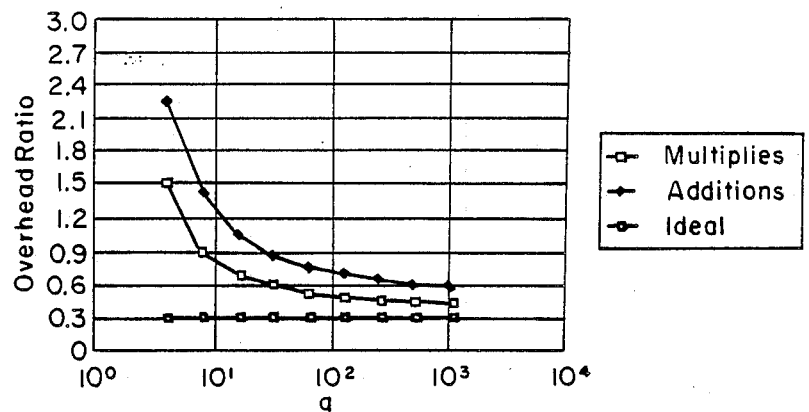
FIG. 5 is a graph illustrating the behavior of overhead ratios for complex Fast Fourier transform.

FIG. 5 shows the behavior of these overhead ratios as a function of the FFT length q. The line labeled "Ideal" refers to the ratio C/N=0.3, the minimum redundancy incurred by using C extra processors. It is clear that our scheme is quite competitive with Triple Modular Redundancy, which has an overhead ratio of 2. Reducing the overhead even further, however, can make this scheme even more appealing. For example, we can try to increase the quantity of computation T(p, q) performed inside each processor, so that the checksum overhead is amortized over more work. We can decrease the number of checksum processors by using weights with a wider range of values. (This, however, increases the difficulty of computing the checksums and syndromes, and also makes the weight vectors more correlated, thereby degrading the method's probability of correct diagnosis and repair.) Finally, we could reduce the work involved in computing the likelihood ratios by about a factor of C by using various suboptimal detection and correction algorithms, as described in the next section.

Ad Hoc Methods

An interesting property of weight vectors constructed from small integers is that if the computational noise is low, then there exist simple, ad hoc, fast methods for detecting which processor has failed. These methods behave like Hamming Code or "parity check" error coding methods, and are based on applying a threshold test to each syndrome separately, and quantizing each to a digit $-M$ through $+L$. The processor with the matching weight vector pattern is then the culprit.

The simplest case is when the weights have been chosen to have values 0 or 1. A reasonable ad hoc test would then be:

$$\text{Set } b_k[n] = \begin{cases} 1 & \text{if } \|s_k[n]\|^2 > \gamma \\ 0 & \text{else} \end{cases} \quad (74)$$

for $k = N + 1, \ldots, N + C$ where Y is some threshold level. Then conclude that the processor with weight vector code given by $(b_{N+1}[n], \ldots, b_{N+C}[n])$ has failed. In effect, this method replaces the pie-slice shaped decision regions of the optimal method with more rectangular boundaries. Computation of the failure detection hypothesis is reduced from C(C+1) (q+N)/2 to Cq operations. Correcting the failure would take another Cq operations.

This idea can be straightforwardly extended to symmetrical ranges of weight values in the several ways. Suppose that the weights have values $-1$, 0, or $+1$. A simple element-by-element fault correction test would then operate as follows:

$$\text{Set } b_k[i,n] = \begin{cases} +1 & \text{if the } i^{th} \text{ element of } s_k[n] \text{ is } > \gamma \\ 0 & \text{if the } i^{th} \text{ element of } |s_k[n]| \text{ is } < \gamma \\ -1 & \text{if the } i^{th} \text{ element of } s_k[n] \text{ is } < -\gamma \end{cases} \quad (75)$$

Figure 6:
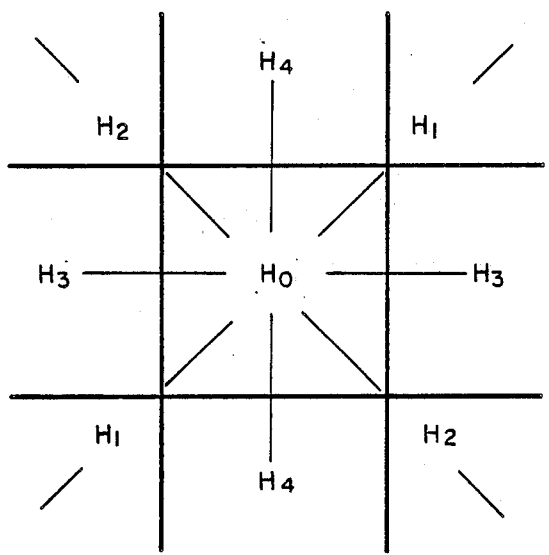
FIG. 6 is an illustration of rectilinear decision regions.
Figure 7:
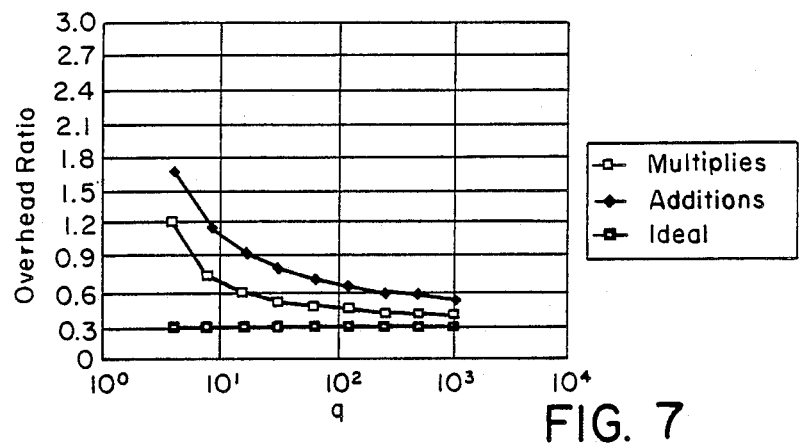
FIG. 7 is a graph of overhead ratio for complex FFT with the ad hoc method.

Then conclude that the $i^{th}$ output element of the processor with weight vector code given by $\pm(b_{N+1}[n] \ldots b_{N+C}[n])$ has failed. Once again, this ad hoc method replaces the optimal pie-slice shaped decision regions with more rectilinear regions, as illustrated in FIG. 6. Computation is approximately 2Cq operations, which is twice that of our first ad hoc method. The advantage is that we can build more weight vectors with values $-1$, 0, $+1$ than with only 0, $+1$, and can therefore protect more processors against failure. A disadvantage is that we perform the correction on an element-by-element basis, which is potentially time-consuming and prone to misdiagnosis.

This strategy can be extended to cover more general weight values in a range $-M$ to $+L$, quantizing each syndrome independently to extract the weight. Note, however, that the computation required may easily match that of the optimal algorithm, so that this extension may not be worthwhile.

For our complex FFT example above, the ad hoc method would reduce the computation overhead to about:

$$0.3 + \frac{18q}{20q\log_2(q/2)}$$

for real multiplies, and about $$0.3 + \frac{69q + 6}{30q\log_2 q - 10q}$$

for real additions. Comparing with the figures for the optimal method, it is clear that the reduction achieved by this approach is not large except for small q.

Source of Numerical Computational Errors

A major complication in any realistic fixed or floating point implementation of this system, is that the actual computation noise behavior depends strongly on the exact type of arithmetic used inside each processor. Choices must be made about the number of bits to be retained, when rounding is to take place, and whether the same or different computational precision is to be used in the normal processors, the checksum processors, the checksums, syndromes, or the fault detect/correct units. Different choices lead to different tradeoffs in the choice of the weights, in the amount of computational noise, and in the thresholds required for the GLRT test.

Consider, for example, the case of fixed point arithmetic with B bits of precision. Assume that the input vectors $x_1, \ldots, x_N$, and the output vectors $y_1, \ldots, y_N$ may each span the full dynamic range $\pm 2^{B-1}$. The dynamic range of each input checksum will be $\pm 2^{B-1} \omega_{N+k}$, where:

$$\omega_{N+k} = \sum_{m=1}^{N} |w_{N+k,m}| \qquad (76)$$

for $k = 1, \ldots, C$

To ensure that each input checksum also spans the available dynamic range without overflow, we must scale the weights so that $\omega_{N+k} < 1$. For example, with $N=10$ and $C=3$, we might choose the convenient weight matrix:

$$W = \qquad (77)$$

$$\begin{bmatrix} \frac{1}{8} & \frac{1}{8} & \frac{1}{8} & \frac{1}{8} & 0 & 0 & \frac{1}{8} & \frac{1}{8} & \frac{1}{8} & \frac{1}{8} & -1 & 0 & 0 \\ \frac{1}{8} & -\frac{1}{8} & 0 & 0 & \frac{1}{8} & \frac{1}{8} & \frac{1}{8} & \frac{1}{8} & -\frac{1}{8} & -\frac{1}{8} & 0 & -1 & 0 \\ 0 & 0 & \frac{1}{8} & -\frac{1}{8} & \frac{1}{8} & -\frac{1}{8} & \frac{1}{8} & -\frac{1}{8} & \frac{1}{8} & -\frac{1}{8} & 0 & 0 & -1 \end{bmatrix}$$

The dynamic range of the syndromes, on the other hand, will be $\pm 2^{B-1}(\omega_{N+k}+1)$. To prevent overflow in all cases, we could use the same weights but divide the result by two. If we focus exclusively on the case of a single processor failure, however, and assume that the remaining numerical errors are small, then the division by two is unnecessary. This is because the syndromes will be approximately $s_{N+m}[n] \simeq W_{N+m,k}\phi[n]$. Provided we choose all weights less than one in magnitude, no overflow should occur.

Unfortunately, in order to make $\omega_{N+k} \leq 1$, all the weights will have to be fractions less than one, and so rounding or truncation errors will be introduced in the checksum computation. The variances $\Delta_k$ and $\Gamma_k$ of each input and output checksum will all be approximately the same, and should be on the order of a few bits at most. An important problem with this weight normalization is that the weights $W_{N+k,m}$ are $O(1/N)$ for $m=1, \ldots, N$, while $W_{N+k,N+k}=-1$. Since $$s_{N+k}[n] = -\sum_m w_{N+k,m}\phi_k[n],$$

the syndromes $s_{N+k}[n]$ are heavily dominated by the checksum processor errors $\phi_{N+k}[n]$. Errors on the other processors, $\phi_{1[n]}, \ldots, \phi_N[n]$, will have to be $O(N)$ before they significantly affect the syndromes.

One solution for this is to choose the weights to be small integer values, so that they all have about the same magnitude. The weight matrices in (70), (71), or (72) would be good examples. Unfortunately, the gain $\omega_{N+k}$ will be $O(N)$, and the dynamic range of the input and output checksums will be $O(N)$ times larger than that of the input or output data. Either $\log_2 N$ extra bits must be added to the checksum calculations and the checksum processors, or else we must be willing to accept potential overflows in the checksum processor and syndrome outputs.

A special case of particular interest is Finite Impulse Response (FIR) filters, when the processors linearly filter the data by using a multiply-accumulate structure, multiplying each fixed-point datum by some coefficient and summing into a very wide accumulator. In this case, no rounding occurs inside the processor until the accumulator is scaled, rounded and output. Best performance in our fault tolerant scheme will clearly be achieved if we force each processor to instead output the full contents of the accumulator, and we compute the syndromes using the exact values in the accumulators. In this case, no rounding will occur at all in the syndrome computation, and we could rely on very quick ad hoc methods to detect and correct any failures. This trick, however, will not work for linear calculations such as the FFT, which use multiple stages of computation and rounding.

Floating point arithmetic, combined with integer weights, would eliminate the problems of dynamic range while weighting errors from the various processors evenly. The disadvantage is that the size of the rounding error in floating point depends on the size of the data. Since the checksum processor inputs would generally have larger input values than the other processors, they would incur more rounding error, and thus unduly influence the syndromes. Another difficulty is that our derivation of the optimal GLRT test assumed a fixed level of computational noise, independent of the data. For floating point computation, a better model would scale the noise proportionally to the data. Unfortunately, this would greatly complicate the optimal fault detection/correction process.

A final comment is that our model is suspect even for the case of fixed point arithmetic. The problem is that the thresholds suggested by the GLRT test will only declare a processor failure when the syndromes are so large that the probability of this much computational noise is less than the probability of a hardware failure. The test must rely heavily on the exact shape of the tail of the Gaussian noise density when it sets this threshold value. Unfortunately, the actual probability density for the computational noise only resembles a Gaussian when the computational noise is moderate and when a large number of independent roundings have contributed to the final noisy outputs. Out in the tails, where the thresholds are usually set, there is no reason to expect the actual density to resemble a Gaussian. For example, in most fixed point calculations there is a maximum value that the computation noise could ever achieve. Placing the threshold beyond this point would be pointless. A more practical approach, therefore, is to retain the form of the GLRT test, but to set the thresholds $\gamma'_k$ based on heuristic measurements of the actual syndrome behavior. Increasing the $k^{th}$ threshold increases the probability of deciding that processor k has failed; increasing all the thresholds increases the probability of deciding that some processor has failed.

Generalization for Detection/Correction of Multiple Faults

The approach to optimal fault detection/correction can be easily extended to cover multiple simultaneous faults, although the computational burden becomes higher, good weight vectors are hard to find, and the level of reliability is difficult to match in the front and back ends. Suppose we are trying to correct up to $K_m$ simultaneous failures, and to detect up to $K_m+L_m$ failures. As can be shown, we will need at least $C \geq 2K_mL_m$ checksum processors and a corresponding rank $(2K_m+L_m)$ weight matrix W. Given a Gaussian model of the computation noise, we can again derive an optimal generalized likelihood ratio test for fault detection/correction. Let $H_{kl} \ldots H_{kK}$ represent the hypothesis that K failures have occurred, $0 \leq K \leq K_m+L_m$, in processors $k_l, \ldots, k_K$. We will model processor errors $\phi_{k_l}[n], \ldots \phi_{kK}[n]$ as non-zero mean Gaussian random variables with unknown means $\bar{\phi}_{k_l}[n], \ldots, \bar{\phi}_{kK}[n]$ and known covariances $\Phi_{k_l}, \ldots, \Phi_{kK}$. The remaining processor errors $\phi_k[n]$ are modeled as zero mean Gaussian random variables with known variance $\Phi_k$. (To simplify the notation, we will drop the time index '[n]' from now on). Let $\hat{\phi}_{k_l}, \ldots, \hat{\phi}_{kK}$ be the maximum likelihood estimates of the means of the failed processor errors, and define $L_{k_l} \ldots k_K$ given these ML estimates $\hat{\phi}_{k_i}$.

$$L_{k1\ldots kK} = \max_{\phi_{k1},\ldots,\phi_{kK}} \log p(s, H_{k1\ldots kK} | \phi_{k1}, \ldots, \phi_{kK}) \quad (78)$$

(The $\hat{\phi}_{k_i}$ are the values where the maximum is achieved.) Substituting the formula for a Gaussian density into this expression, together with the formula for the prior density on the probability of processor failure from (16) we can show that:

$$\phi_{k1},\ldots,\phi_{kK} \leftarrow \min_{\phi_{k1},\ldots,\phi_{kK}} \left\| s + \sum_{k=1}^{K} W_{ki}\phi_{ki} \right\|_{V-1}^{2} \quad (79)$$

Solving this gives the formula:

$$\begin{bmatrix} \phi_{k1} \\ \cdot \\ \cdot \\ \cdot \\ \phi_{kK} \end{bmatrix} = - \left[ \begin{bmatrix} W_{k1}^T \\ \cdot \\ \cdot \\ \cdot \\ W_{kK}^T \end{bmatrix} V^{-1} [W_{k1} \ldots W_{kK}] \right]^{-1} \begin{bmatrix} W_{k1}^T \\ \cdot \\ \cdot \\ \cdot \\ W_{kK}^T \end{bmatrix} V^{-1} s \quad (80)$$

Substituting this back into the log likelihood and applying much algebra gives the formulas:

$$L_0 = -\tfrac{1}{2}\|s\|_{V-1}^2 + \gamma_0 \quad (81)$$

$$L_{k1\ldots kK} = -\tfrac{1}{2}\left\| s + \sum_{i=1}^{K} W_{ki}\phi_{ki} \right\|_{V-1}^{2} + \gamma_{k1\ldots kK}$$

Define the relative log likelihood $L'_{k_l} \ldots k_K$ as twice the difference between the log likelihoods of hypotheses $H_{k_l} \ldots k_K$ and $H_o$. Then:

$$L_{k1\ldots kK}' = 2(L_{k1\ldots kK} - L_0) \quad (82)$$

$$= s^T V^{-1} [W_{k1} \ldots W_{kK}] \begin{bmatrix} \phi_{k1} \\ \cdot \\ \cdot \\ \phi_{kK} \end{bmatrix} + \gamma_{k1\ldots kK}'$$

where $\gamma'_{k_l} \ldots k_K$ is a constant.

The computational effort simplifies substantially if the processor noise and syndrome variance are white $\bar{\Phi}_{k_i} = \bar{\sigma}^2_{k_i} I, \Phi_{k_i} = \sigma^2_{k_i} I$, and $V = \sigma_V^2 I$. The quickest computational approach is:

$$\rho_{k,1} = \frac{1}{\sigma_V^2} s_k^T s_l \quad \text{for } k = N+1, \ldots, N+C \text{ and } l = k, \ldots, N+C \quad (83)$$

$$L_{k1\ldots kK}' = tr\left\{ G_{k1\ldots kK} \begin{bmatrix} \rho_{N+1,N+1} & \cdots & \rho_{N+1,N+C} \\ \cdot & \cdots & \cdot \\ \cdot & & \cdot \\ \rho_{N+C,N+1} & \cdots & \rho_{N+C,N+C} \end{bmatrix} \right\} + \gamma_{k1\ldots kK}' \quad (84)$$

where:

$$G_{k1\ldots kK} = \begin{bmatrix} w_{N+1,k1} & \cdots & w_{N+1,kK} \\ \cdot & \cdots & \cdot \\ \cdot & & \cdot \\ w_{N+C,k1} & \cdots & w_{N+C,kK} \end{bmatrix} \begin{bmatrix} r_{k1k1} & \cdots & r_{k1kK} \\ \cdot & \cdots & \cdot \\ \cdot & & \cdot \\ r_{kKk1} & \cdots & r_{kKkK} \end{bmatrix}^{-1} \begin{bmatrix} w_{N+1,k1} & \cdots & w_{N+C,k1} \\ \cdot & \cdots & \cdot \\ \cdot & & \cdot \\ w_{N+1,kK} & \cdots & w_{N+C,kK} \end{bmatrix} \quad (85)$$

is a $C \times C$ matrix of constants which can be precomputed, and where $r_{kl}$ is the cross-correlation between the $k^{th}$ and $l^{th}$ weight vecotrs, (46).

The optimal $K_m+L_m$ fault detection/correction algorithm computes all these relative likelihoods for every possible set of K processor failures, for $0 \leq K \leq K_m+L_m$. It then chooses the largest of the likelihoods. If the largest corresponds to $\hat{K}=0$, then no faults have occurred. Otherwise, if $\hat{K}>0$, then our best guess is that K faults have occurred. If $\hat{K} \leq K_m$, then our best guess is that these faults are in processors $\hat{k}_1, \ldots, \hat{k}_K$, and the optimal estimate of the correct processor output values are:

$$\hat{v}_{k_i} = v_{k_i} - \hat{\phi}_{k_i} \quad \text{for } i = 1, \ldots, K \tag{86}$$

where the $\hat{\phi}_{k_i}$ are the estimates given in (80), and which can be efficiently calculated as follows:

$$\hat{\phi}_{k_i} = - \sum_{m=N+1}^{N+C} w_{m,k_i} s_m \tag{87}$$

where the normalized weights:

$$\begin{bmatrix} w_{N+1,k_1} & \cdots & w_{N+C,k_1} \\ \cdot & & \cdot \\ \cdot & \cdots & \cdot \\ \cdot & & \cdot \\ w_{N+1,k_K} & \cdots & w_{N+C,k_K} \end{bmatrix} = \tag{88}$$

$$\begin{bmatrix} r_{k_1 k_1} & \cdots & r_{k_1 k_K} \\ \cdot & & \cdot \\ \cdot & \cdots & \cdot \\ \cdot & & \cdot \\ r_{k_K k_1} & \cdots & r_{k_K k_K} \end{bmatrix}^{-1} \begin{bmatrix} w_{N+1,k_1} & \cdots & w_{N+C,k_1} \\ \cdot & & \cdot \\ \cdot & \cdots & \cdot \\ \cdot & & \cdot \\ w_{N+1,k_K} & \cdots & w_{N+C,k_K} \end{bmatrix}$$

can be precomputed.

If we wish to use the syndromes not only for fault detection, but also to filter out computational noise from the working processors, then it is straightforward to show that the best estimates of the processor outputs are:

$$\hat{y}_m = \begin{cases} y_m + \dfrac{\sigma_m^2}{\sigma_\nu^2} \left( \sum_{l=N+1}^{N+C} w_{1,m} s_1 + \sum_{i=1}^{K} r_{m,k_i} \hat{\phi}_{k_i} \right) & \text{for } m \neq k_1, \ldots, k_K \\ y_m - \hat{\phi}_m & \text{for } m = k_1, \ldots, k_K \end{cases} \tag{89}$$

In theory, gross failure will occur in this system only if more than $K_m + L_m$ simultaneous failures occur. If $P_f$ is the probability of any single processor failure, and failures are independent, then:

$$\approx \frac{(N+C)!}{(N+C-K_m-L_m-1)!(K_m+L_m+1)!} P_f^{K_m+L_m+1}$$

This is achieved using only $N+C$ processors. Note that we could achieve a similar level of fault tolerance by using N groups of $2K_m + L_m + 1$ processors operating in parallel, with a special voter attached to each group. If at least $K_m + L_m + 1$ processors agree, then the voter outputs this value. If fewer processors agree, then the voter flags an uncorrectable error. This system can detect and correct up to $K_m$ failures in each group, and can detect up to $K_m + L_m$ failures in each group. The probability of system failure is the probability of more than this number of processors failing in any group:

Prob(system failure for $2K_m + L_m + 1$ modular redundant system))

$$\approx N P_f^{K_m + L_m + 1}$$

Such a system would require $N(2K_m + L_m + 1)$ processors, however, which is considerably more than our system requires.

In reality, to match the reliability of the processors, the input data distribution network and the fault detection/correction system will have to be implemented using $2K_m + L_m + 1$ modular redundancy with the special voter discussed above. Thus, we cannot completely avoid high levels of modular redundancy and the corresponding hardware overhead in our design. The failure rates of the input and fault correction system will also degrade our overall system reliability. Another problem is that the probability of misdiagnosis with double or higher fault correction is much higher than with single fault correction, because there are so many more different hypotheses that must be entertained.

Much more serious is that the computation required to implement the optimal $K_m + L_m$ fault correction algorithm can easily grow to be much larger than that required for computing F. Let us assume that the syndromes are white Gaussian noise under $H_0$. Using the algorithm suggested above, the ratio of overhead to detect and correct the failures to that required for data computation is:

$$\frac{C}{N} + \frac{C(p+q)}{T(p,q)} + (2K_m + L_m + 1) \left[ \frac{C(C+1)q/2}{NT(p,q)} + \frac{C(C+1)/2 \sum_{k=1}^{K_m+L_m} \frac{(N+C)!}{(N+C-k)!k!}}{NT(p,q)} + \frac{K_m C q}{NT(p,q)} \right]$$

The first term reflects the fact that C extra processors must compute F. The second term includes the work of computing the input checksums and the output syndromes. The factor $2K_m + L_m + 1$ in front of the brackets is because the fault correction system must be replicated this many times to achieve the desired level of reliability. The first term inside the brackets is the overhead of computing the $\rho_{kl}$. The second term counts the work of evaluating all the relative likelihoods for up to $K_m + L_m$ simultaneous failures. The last term is the work required to fix up to $K_m$ failed outputs. Note that the middle term inside the brackets grows as $O((2K_m + L_m + 1)(N+C)^{K_m + L_m - l})$. For large numbers of processors and high levels of fault tolerance, the work involved in redundantly computing the fault correction can therefore grow quite large, surpassing the level of computation for a $2K_m + L_m + 1$ modular system.

Yet other problems concern the choice of weight vectors. It is not easy to find simple sets of weight vectors for which the weight matrix has rank $2K_m + L_m$. Abraham and Jou have suggested using weights of the form $W_{N+m,k} = A_k^{m-l}$ where the contents $A_k$ are all different. In particular, they suggested using powers of two, $A_k=2^k$, since these weights are easy to multiply. Unfortunately, these weights lead to major difficulties with dynamic range and numerical accuracy. A better choice, if complex numbers were allowed, would be $A_k=e^{j\omega k}$, where the frequencies $\omega_k$ may be uniformly or non-uniformly spaced in the range $-\pi < \omega_k \leq \pi$. These weights do not unnecessarily increase the size of the checksums, and they lead to weight vectors which are well spaced. Unfortunately, it is difficult in general to find weights which are small integers or small positive or negative powers of two, and which also have the necessary rank $2K_m+L_m$ property.

A related difficulty is that it is difficult to develop good ad hoc methods for quickly assigning the blame when the hypotheses include multiple failures. Unfortunately, the trick of individually thresholding the syndromes does not work well for multiple failures. For double or higher fault correction, it thus seems difficult to avoid at least quadratic growth in the number of overhead computations as the number of processors $N+C$ increases.

Yet another argument against using greater than single fault correction is that if faults are truly independent (admittedly, a somewhat dubious assumption), then the probability of two simultaneous transient faults is extremely low. A more likely scenario is that one processor has been misbehaving for awhile, and then a second processor has a transient or permanent fault. This latter case, however, can be more naturally handled by collecting statistics on which processors the fault correction system identifies as faulty. If one processor consistently needs correction, then this processor could be replaced by a spare processor at the next available opportunity. The spare could be chosen from a pool of processors, or else one of the checksum processors could be converted and the level of fault tolerance could be decreased. If the replacement can be done quickly, then the likelihood of gross failure of a single fault correction system could be reduced substantially.

Architecture

Figure 8:
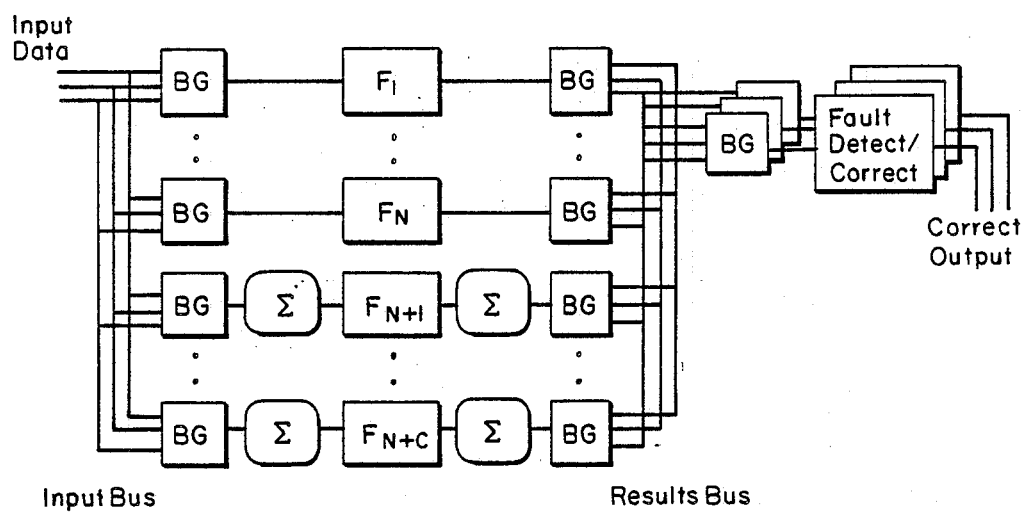
FIG. 8 is an illustration of a fault-tolerant architecture according to the invention.

One possible design for our fault tolerant architecture is shown in FIG. 8. A triplicated input bus supplies the data $x_1[n], \ldots, x_N[n]$ to the N normal processors and to C dedicated input checksum calculators. Input Bus Guardian units (BG) vote on the values on the three buses to provide correct values to the attached processor. Each working processor k retains only the data $x_k[n]$. Dedicated checksum processors, however, collect all data on the bus, multiply by appropriate weights, and sum to form input checksums $x_{N+1}[n], \ldots, x_{N+C}[n]$. All processors apply the function F to their inputs as soon as the input data or the checksum becomes available; processors will thus begin in staggered order. As they finish, the working processors output their results $y_1[n], \ldots, y_N[n]$ in sequence down the results bus. Output BG units drive all three buses with the data; they also prevent a failed processor from hanging the bus. Triplicated fault detect/correct (D/C) units collect all the results via BG input units. Dedicated syndrome calculators on processors $N+1, \ldots, N+C$ also monitor the results bus through BG units, multiply by appropriate weights, and calculate the syndromes as the data goes by. After the last processor's output passes down the results bus, the computed syndromes are output in sequence through BG units to the results bus, where they are collected by the D/C units. In a single fault detect system, the triplicated D/C units would compute the energy of the syndromes, and flag an error if it is too large. In a single fault correction system, the processor outputs would be buffered, while the $N+C+1$ likelihoods are computed. If a failed processor is detected, its output would be corrected. Finally, the correct results are output in triplicate.

The unidirectional data flow in this design makes it possible to deeply pipeline this system for high performance. Batch $n+3$ of input data can be loaded and input checksums can be computed, while the processors are working on data from batch $n+2$, the syndromes are calculated for batch $n+1$, and faults are checked for batch n.

Control over the buses to properly sequence data through the system will either have to be handled through conventional bus arbitration techniques, or by a triplicated central controller. Program control may be handled individually by each processor, or the array may be driven in SIMD fashion by a triplicated central controller.

Notice that the input and output checksum machines are not triplicated in this architecture. The reason is that a fault within a checksum machine cannot be distinguished from a fault in the corresponding non-triplicated checksum processor. Triplicating these checksum units is therefore unnecessary, since the resulting slight loss in overall checksum processor reliability is usually acceptable.

For improved long-term reliability, the D/C units may collect statistics on which processors have apparently failed. If a processor consistently outputs faulty data, a triplicated system controller could replace it with a spare processor. Note that considerable extra circuitry would be required to implement such a sparing approach. Reliable mechanisms would be needed to enable and disable processors, and to assign addresses to processors. In addition, to reap the full benefits of this approach, spare bus systems and spare D/C units would also have to be available.

Numerous variations on this architecture can be devised. A major issue is the design of the communications systems. For example, the system could be organized around a single triplicated bus. This would reduce the number of bus guardian units required, and would reduce overall system complexity. However, the bandwidth of the single triplicated bus would be a major bottleneck in such a system. Greater communications bandwidth could be achieved by using more than two bus systems or by using other network structures, although the complexity of a reliable implementation would be quite high.

For greater flexibility, checksum calculators could be attached to every processor, but only enabled in those processors designed for checksum computation. We could reduce the hardware requirements by using the same checksum calculator for both the input checksum and the syndrome, or even using the checksum processors themselves to compute these sums. The tradeoff is that system performance may suffer, as the first N processors must idle during the checksum and syndrome computations. This inefficiency may be especially important if the weights are not simply $\pm 1$ and 0.

Figure 9:
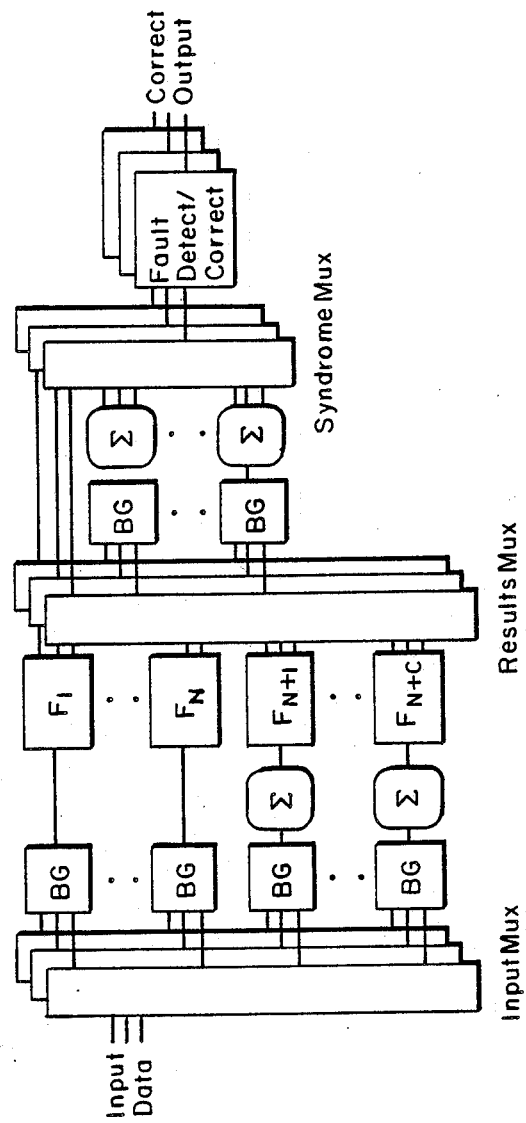
FIG. 9 is an illustration of an architecture for a multiplexor-based fault-tolerant system.

The unidirectional data flow allows the use of multiplexors instead of buses; these are typically easier to defend against jamming by failed hardware bus drivers. A typical configuration is shown in FIG. 9. Input data is distributed through a triplicated multiplexor to the processors. Control over the multiplexors to properly sequence data through the system will either have to be handled through conventional bus arbitration techniques, or by a triplicated central controller. Majority voters on these processor inputs protect against any single bus failure. As data is loaded, the checksum processors multiply the values by the appropriate weights and sum to compute the input checksums. All processors apply the function F to their inputs as soon as the input data or the checksum becomes available; processors will thus begin in staggered order. During the output cycle, the N+C processors broadcast their outputs $y_k[n]$ in order through a triplicated output multiplexor to the syndrome computation system. C dedicated checksum computers are fed by this multiplexor through majority voters which protect against any single multiplexor failure. As the data comes through the multiplexor, the values are multiplied by the appropriate weights and summed to form the syndromes. Finally, the syndromes are fed through the final triplicated multiplexor to the triplicated fault detector/corrector systems. This unit tests the syndromes, corrects the data if necessary, and outputs the corrected results in triplicate.

Conclusions

This invention presents a new approach to fault tolerance in digital signal processing systems using multiple processors to compute a fixed linear function of many batches of input data. N working processors perform the same linear operation F on N different batches of data. C different checksums are computed by taking different weighted linear combinations of the input data, and C extra checksum processors compute F on these checksums. Syndromes are then computed by subtracting the same weighted linear combinations of the first N processor outputs from the C checksum processor outputs. With no computational noise and no hardware failures, these syndromes should all be zero. With a hardware failure, the syndromes should have values proportional to the weight corresponding to that processor, and to the size of the fault. By choosing a weight matrix with rank $2K_m+L_m$, we can correct up to $K_m$ errors, and detect up to $K_m+L_m$ errors.

Unfortunately, if the processors use truncation and rounding in their arithmetic, their outputs will not be exact and the syndromes will deviate from zero. To deal with this problem, we use a Gaussian model of the computational noise process, together with a simple failure model. An optimal estimate of the failure status of the machine is then derived via a Generalized Likelihood Ratio Test (GRLT). In this test, we construct the joint likelihood of the observed syndromes and each failure hypothesis. The most likely combination is then chosen as our best guess as to which processor failed, if any. To correct a failed processor's output, we compute its most likely value given the syndromes. In effect, the algorithm projects the syndromes onto each weight vector in turn, and chooses the failure hypothesis with the largest projection. We can also construct a GLRT in which the syndromes are used not only for fault detection/correction, but also to help filter out some of the computational noise from the working processor outputs. This method involves a similar projection approach, with virtually the same likelihoods, and differs only in its choice of thresholds.

When the syndromes behave like white Gaussian noise, the formulas for the optimal algorithm simplify substantially. A fast algorithm first computes a C×C correlation matrix for the syndromes. The $k^{th}$ relative likelihood is then equal to a quadratic form involving this correlation matrix and the $k^{th}$ weight vector. In practical examples, the ratio of the number of operations required for fault checking to those required for data computation is well below one, and the method thus involves much less computation than triple modular redundancy.

Because the computational noise is statistical in nature, this fault detection/correction algorithm has a certain probability of misbehaving. We calculated the probability of gross system failure, and showed that it was comparable to that of triple modular redundancy. The probability of misdiagnosis and the variance of the fault correction were also computed. We showed that these errors could be minimized by using weight vectors that were close to orthogonal, by batching together large amounts of data, and by adjusting the thresholds in the GLRT. To find and correct transient errors, the batch size over which error correction is performed should be kept small to improve the method's sensitivity. To focus on permanent failures, the batch size should be kept large to improve the method's accuracy. In all cases, small failures are difficult to diagnose correctly. Fortunately, in such cases, the error is unlikely to be important. Another interesting point is that there is a fundamental three-way tradeoff between the number of extra checksum processors, the number of simultaneous faults that can be covered, and the robustness to numerical error. Adding more checksum processors can either be used to help cover more faults, or to spread the weight vectors farther apart to decrease the probability of misdiagnosis.

We discussed good choices of weight vectors for both real and complex data. Choosing the weights to be small integers or small powers of 2 leads to easier checksum and syndrome computation. Surprisingly, this choice also leads to "complete" sets of weight vectors; the resulting syndromes are often white Gaussian noise, and the optimal algorithm is simple to apply.

The method is easy to extend to detection and correction of multiple faults. The difficulty is that to detect $K_m+L_m$ faults, $O((N+C)^{K_m+L_m})$ relative likelihoods must be computed and compared on $2K_m+L_m+1$ fault detection/correction processors ganged to work in parallel. This results in a large amount of computational overhead that may be impractical.

Many different architectures can be used to implement this fault tolerance scheme, some of which we presented above. We are currently studying the application of some of these architectures to digital signal processing in underwater vehicles.

What is claimed is:

1. Fault-tolerant signal processing machine comprising a plurality of processors each performing identical linear processing operations on its input signal;
    at least one checksum processor adapted to perform the same linear processing operation as the plurality of processors;
    computing apparatus using inexact arithmetic for forming a linear combination of the input signals to form an input checksum signal and for operating on the input checksum signal with the checksum processor to generate a processed input checksum signal;
    computing apparatus using inexact arithmetic for forming the same linear combination of the outputs of the plurality of processors to produce an output checksum signal;

computing apparatus using inexact arithmetic for comparing the output checksum signal with the processed input checksum signal to produce an error syndrome; and computing apparatus for generating a generalized likelihood ratio test from the error syndrome for assessing a likeliest failure hypothesis.

2. The signal processing machine of claim 1 wherein the generalized likelihood ratio test comprises computing a weighted quadratic function of the error syndrome for each failure hypothesis.

3. The signal processing machine of claim 2 wherein the weighted quadratic functions are based on a Gaussian model of computational noise.

4. The signal processing machine of claim 1 wherein the generalized likelihood ratio test computations filter out a portion of the computational noise of the plurality of processors.

5. The signal processing machine of claim 1 including one checksum processor wherein weights used for forming the linear combination are all non-zero.

6. The signal processing machine of claim 1 including two checksum processors for single fault correction.

7. The signal processing machine of claim 6 wherein weights used for forming the linear combination are small integers or small powers of 2.

8. The signal processing machine of claim 6 wherein weights used for forming the linear combination are chosen from a symmetrical range of integers to form a complete set.

9. The signal processing machine of claim 6 wherein weights used for forming the linear combination are chosen to be zero or $+1$.

10. The signal processing machine of claim 1 wherein scaling during checksum and syndrome formation is used to control the dynamic range of their values.

11. The signal processing machine of claim 1 wherein the plurality of processors and the at least one checksum processor are grouped on a single replicated bus.

12. The signal processing machine of claim 1 further including a replicated input distribution bus to provide data to the plurality of processors and the at least one checksum processor and a results bus to collect the processor and syndrome outputs.

13. The signal processing machine of claim 1 further including replicated multiplexers to distribute data to the plurality of processors and the at least one checksum processor, and replicated multiplexers to collect the outputs and forward them to the syndrome computers.

* * * * *

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

Column 4, line 15: change "y" to -- $\underline{y}$ --.
          line 19: change "x" to -- $\underline{x}$ -- and "y" to -- $\underline{y}$ --.
          line 24: change "x" to -- $\underline{x}$ --.
          line 43: change "$s_k[n]$" to -- $\underline{s}_k[n]$ --.
          line 57: change "$\delta$" to -- $\underline{\delta}$ --.
          line 65: change "$\varepsilon$" to -- $\underline{\varepsilon}$ --.
Column 5, line 2: change "$\lambda$" to -- $\underline{\lambda}$ --.
          line 59: change "$\phi$" to -- $\underline{\phi}$ --.
          line 65: change "$s_m[n]$" to -- $\underline{s}_m[n]$ -- and "$\phi$" to -- $\underline{\phi}$ --.
          line 67: change "$s[n]$" to -- $\underline{s}[n]$ --.
Column 6, line 28: change "$s_{N+1}[n]$ and $s_{N+2}[n]$" to -- $\underline{s}_{N+1}[n]$ and $\underline{s}_{N+2}[n]$ --.
          line 34: change "$\phi$" to -- $\underline{\phi}$ --.
Column 7, line 65: change "$\delta$" to -- $\underline{\delta}$ -- and "$\varepsilon$" to -- $\underline{\varepsilon}$ --.
          line 66: change "$\lambda$" to -- $\underline{\lambda}$ --.
Column 8, line 1: change "$\phi$" to -- $\underline{\phi}$ --.
          line 17: change "$\overline{y}_m[n]=Fx_m[n]$" to -- $\overline{\underline{y}}_m[n]=F\underline{x}_m[n]$ --.
          line 18: change "$\overline{y}[n]$ and $\overline{y}[n]$" to -- $\underline{y}[n]$ and $\overline{\underline{y}}[n]$ --.
          line 46: change "$s[n]$" to -- $\underline{s}[n]$ --.
          line 57: change "$\overline{\phi}$" to -- $\overline{\underline{\phi}}$ --.
          line 58: change "$\phi$" to -- $\underline{\phi}$ -- and "$\overline{\phi}$" to -- $\overline{\underline{\phi}}$ --.
          line 62: change "$\overline{\phi}$" to -- $\overline{\underline{\phi}}$ --.
          line 63: change "$\overline{\phi}$" to -- $\overline{\underline{\phi}}$ --.

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

Column 9, line 2: change "y[n] and s[n] to $\phi$[n]" to -- $\underline{y}$[n] and $\underline{s}$[n] to $\underline{\phi}$[n] --.

line 3: change "y[n] and s[n] to $\overline{\phi}_k$[n]" to -- $\underline{y}$[n] and $\underline{s}$[n] to $\underline{\overline{\phi}}_k$[n] --.

line 15: change the second occurrence of "$\overline{\phi}$" to -- $\phi$ --.

line 16: change "$\phi_k$" to -- $\overline{\phi}_k$ --.

line 38: change "$\overline{Y}_m$[n]" to -- $\underline{\overline{Y}}_m$[n] --.

line 39: change "$\overline{\Phi}$" to -- $\Phi$ --.

line 53: change "s[n]" to -- $\underline{s}$[n] --.

line 54: change "$\overline{\phi}$" to -- $\Phi$ --.

Column 9, line 64: change "$\hat{\phi}$" to -- $\hat{\underline{\phi}}$ --.

Column 10, line 25: change "s[n]" to -- $\underline{s}$[n] -- and "$\hat{\phi}$" to -- $\hat{\underline{\phi}}$ --.

line 50: change "$\phi$" to -- $\underline{\phi}$ --.

line 64: change "$\hat{\phi}$" to -- $\hat{\underline{\phi}}$ --.

line 65: change "$\underline{s}$[n]" to -- $\underline{s}$[n] --.

Column 11, line 2: change "$\hat{Y}_k$[n]" to -- $\hat{\underline{Y}}_k$[n] --.

line 36: change "$\overline{y}$[n]" to -- $\underline{\overline{y}}$[n] --.

line 37: change "$\overline{\Phi}$" to -- $\Phi$ --.

line 46: change "$\hat{y}$[n] and $\hat{\Phi}_k$[n]" to -- $\hat{\underline{y}}$[n] and $\hat{\underline{\Phi}}_k$[n] -- and "$\overline{y}$[n] and $\overline{\Phi}_k$[n]" to -- $\underline{\overline{y}}$[n] and $\underline{\overline{\Phi}}_k$[n] --.

line 49: change "$\hat{\overline{y}}$[n]" to -- $\hat{\underline{\overline{y}}}$[n] --.

line 66: change "$\hat{\phi}$" to -- $\hat{\underline{\phi}}$ --.

Column 12, line 17: change "$\hat{\phi}$" to -- $\hat{\underline{\phi}}$ --.

line 22: change "$\hat{\phi}$" to -- $\hat{\underline{\phi}}$ --.

line 25: change "$\hat{y}$[n]" to -- $\hat{\underline{y}}$[n] --.

UNITED STATES PATENT AND TRADEMARK OFFICE
CERTIFICATE OF CORRECTION

PATENT NO. : 4,964,126
DATED : October 16, 1990
INVENTOR(S) : Bruce R. Musicus, et al It is certified that error appears in the above-identified patent and that said Letters Patent is hereby corrected as shown below:

Column 13, lines 26-55: delete "Detect/Correct Algorithm #1" through "values" and replace it with --

Detect/Correct Algorithm #1
$L'_0[n] = 0$
For $l = N+1, \ldots, N+C$:
   For $m = 1, \ldots, N+C$:

$$\rho_{l,m}[n] = \frac{1}{\sigma_v^2} \underline{s}_l^T[n] \underline{s}_m[n]$$

For $k = 1, \ldots, N$:

$$L'_k[n] = \frac{1}{r_{kk}} \begin{pmatrix} w_{N+1,k} & \cdots & w_{N+C,k} \end{pmatrix} \begin{bmatrix} \rho_{N+1,N+1}[n] & \cdots & \rho_{N+1,N+C}[n] \\ \vdots & \cdots & \vdots \\ \rho_{N+C,N+1}[n] & \cdots & \rho_{N+C,N+C}[n] \end{bmatrix} \begin{pmatrix} w_{N+1,k} \\ \vdots \\ w_{N+C,k} \end{pmatrix} + \gamma'_k$$

For $k = N+1, \ldots, N+C$ $$L'_k[n] = \frac{1}{r_{kk}} \rho_{k,k}[n] + \gamma'_k$$

UNITED STATES PATENT AND TRADEMARK OFFICE
CERTIFICATE OF CORRECTION

PATENT NO. : 4,964,126
DATED : October 16, 1990
INVENTOR(S) : Bruce R. Musicus, et al It is certified that error appears in the above-identified patent and that said Letters Patent is hereby corrected as shown below:

Choose the largest $L'_k[n]$. If $1 \leq k \leq N$, then the corrected output from processor k is:

$$\hat{\underline{v}}_k[n] = \underline{v}_k[n] + \frac{1}{r_{kk}} \sum_{m=N+1}^{N+C} w_{m,k} \underline{s}_m[n]$$

The constants $\gamma'_k$ in the above formula have values: — —.

Column 14, lines 30 to the end and Column 15, lines 1 to 15:
        delete these lines from
        "Detection/Correction/Filtering Algorithm #2"
        through "else" and replace it with --

Detection/Correction/Filtering Algorithm #2
For k=1,...,N:

$$\underline{\tau}_k[n] = \sum_{m=N+1}^{N+C} w_{m,k} \underline{s}[n]$$

$$\hat{\underline{\phi}}_k[n] = -\frac{1}{r_{kk}} \underline{\tau}_k[n]$$

$$L'_k[n] = -\frac{1}{\sigma_v^2} \underline{\tau}_k^T[n] \hat{\underline{\phi}}_k[n] + \gamma'_k$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

For $k=N+1,\ldots,N+C$:

$$\underline{I}_k[n] = \underline{s}_k[n], \qquad \hat{\underline{\Phi}}_k[n] = -\underline{s}_k[n]$$

$$L'_k[n] = \frac{1}{\sigma_v^2} \underline{s}_k^T[n] \underline{s}_k[n] + \gamma'_k$$

Choose the hypothesis with the largest $L'_k[n]$. If $H_0$ is most likely, then:

$$\hat{\underline{v}}_m[n] = \underline{v}_m[n] + \frac{\sigma_m^2}{\sigma_v^2} \underline{I}_m[n] \qquad \text{for } m=1,\ldots,N$$

Otherwise, if $H_k$ is most likely, compute the corrections to the outputs as follows:

$$\hat{\underline{v}}_m[n] = \begin{cases} \underline{v}_m[n] + \dfrac{\sigma_m^2}{\sigma_v^2}\left(\underline{I}_m[n] + r_{mk}\hat{\underline{\Phi}}_k[n]\right) & \text{for } m \neq k \\ \underline{v}_k[n] - \hat{\underline{\Phi}}_k[n] & \text{else} \end{cases}$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

Column 15, line 16: change "$T_k[n]$ and $\hat{\phi}_k[n]$" to -- $\underline{T}_k[n]$ and $\underline{\hat{\phi}}_k[n]$ --.

Column 16, line 65: change "$s[n]$" to -- $\underline{s}[n]$ --.

Column 17, line 33: change "$s[n]$" to -- $\underline{s}[n]$ --.

line 53: change "$|\hat{\underline{v}}|^2 + v^T v$" to -- $\|\underline{\hat{v}}\|^2 + \underline{v}^T \underline{v}$ --.

Column 18, line 57: change "$y[n]$" to -- $\underline{y}[n]$ --.

line 64: change "$y_m[n]$" to -- $\underline{y}_m[n]$ --.

Column 19, line 67: change "$\hat{y}_k[n]$" to -- $\underline{\hat{y}}_k[n]$ --.

Column 20, line 1: change "$y_m[n]$" to -- $\underline{y}_m[n]$ --.

Column 25, line 13: change "$x_1,...,x_N$" to -- $\underline{x}_1,...,\underline{x}_N$ -- and "$y_1,...,y_N$" to -- $\underline{y}_1,...,\underline{y}_N$ --.

line 42: change "$s_{N+m}[n] \approx W_{N+m,k}\phi[n]$" to -- "$\underline{s}_{N+m}[n] \approx W_{N+m,k}\underline{\phi}[n]$ --.

line 57: change "$\phi$" to -- $\underline{\phi}$ --.

line 58: change both occurrences of "$\phi$" to -- $\underline{\phi}$ --.

Column 27, line 12: change both occurrences of "$\phi$" to -- $\underline{\phi}$ --.

line 13: change both occurrences of "$\phi$" to -- $\underline{\phi}$ --.

line 14: change "$\phi$" to -- $\underline{\phi}$ --.

line 15: change both occurrences of "$\hat{\phi}$" to -- $\underline{\hat{\phi}}$ --.

line 18: change "$\hat{\phi}$" to -- $\underline{\hat{\phi}}$ --.

line 20: change "$\hat{\phi}$" to -- $\underline{\hat{\phi}}$ --.

line 27: change "$\hat{\phi}$" to -- $\underline{\hat{\phi}}$ --.

Column 28, line 37: change "$\hat{\phi}$" to -- $\underline{\hat{\phi}}$ --, change "$\sigma$" to -- $\underline{\sigma}$ --, change "$\phi$" to -- $\underline{\phi}$ --, and change "$\sigma$" to -- $\underline{\sigma}$ --.

Column 29, line 1: change "$K$ faults" to -- $\hat{K}$ faults --.

line 8: change "$\hat{\phi}$" to -- $\underline{\hat{\phi}}$ --.

Column 31, line 45: change both occurrences of "x" to -- $\underline{x}$ --.

line 50: change "$x_k[n]$" to -- $\underline{x}_k[n]$ --.

line 52: change both occurrences of "x" to -- $\underline{x}$ --.

line 57: change both occurrences of "y" to -- $\underline{y}$ --.

Column 33, line 13: change "$y_k[n]$" to -- $\underline{y}_k[n]$ --.

UNITED STATES PATENT AND TRADEMARK OFFICE
CERTIFICATE OF CORRECTION

PATENT NO. : 4,964,126
DATED : October 16, 1990
INVENTOR(S) : Bruce R. Musicus, et al It is certified that error appears in the above-identified patent and that said Letters Patent is hereby corrected as shown below:

IN ADDITION, THE FOLLOWING EQUATIONS ARE INCORRECT IN THE PATENT. PLEASE DELETE EQUATIONS 1, 2, 3, 4, 5, 6, 7, 8, 9, 10, 13, 14, 17, 19, 20, 21, 22, 24, 25, 26, 27, 28, 29, 30, 31, 33, 35, 36, 37, 45, 48, 49, 52, 54, 55, 59, 60, 62, 64, 66, 67, 68, 69, 74, 75, 78, 79, 80, 81, 82, 83, 86, 87, 88, and 89 AND REPLACE THEM WITH THE EQUATIONS AS PRINTED BELOW.

$$\underline{y}_k[n] = F\underline{x}_k[n] \qquad \text{for } k=1,\ldots,N \qquad (1)$$

$$\underline{x}_k[n] = \sum_{m=1}^{N} w_{k,m} \underline{x}_m[n] \qquad \text{for } k=N+1,\ldots,N+C \qquad (2)$$

$$\underline{v}_k[n] = F\underline{x}_k[n] = \sum_{m=1}^{N} w_{k,m} F\underline{x}_m[n] \qquad \text{for } k=N+1,\ldots,N+C \qquad (3)$$

$$\underline{s}_k[n] = \underline{v}_k[n] - \sum_{m=1}^{N} w_{k,m} \underline{v}_m[n] \qquad \text{for } k=N+1,\ldots,N+C \qquad (4)$$

UNITED STATES PATENT AND TRADEMARK OFFICE
CERTIFICATE OF CORRECTION

PATENT NO. : 4,964,126
DATED : October 16, 1990
INVENTOR(S) : Bruce R. Musicus, et al It is certified that error appears in the above-identified patent and that said Letters Patent is hereby corrected as shown below:

$$\underline{x}_k[n] = \sum_{m=1}^{N} w_{k,m} \underline{x}_m[n] + \underline{\delta}_k[n] \quad \text{for} \quad k=N+1,\ldots,N+C \qquad (5)$$

$$\underline{y}_k[n] = F\underline{x}_k[n] + \underline{\varepsilon}_k[n] \quad \text{for} \quad k=1,\ldots,N+C \qquad (6)$$

$$\underline{s}_k[n] = \underline{v}_k[n] - \sum_{m=1}^{N} w_{k,m} \underline{v}_m[n] + \underline{\lambda}_k[n] \quad \text{for} \quad k=N+1,\ldots,N+C \qquad (7)$$

$$\underline{s}_k[n] = F\underline{\delta}_k[n] + \underline{\varepsilon}_k[n] - \sum_{m=1}^{N} w_{k,m} \underline{\varepsilon}_m[n] + \underline{\lambda}_k[n] \qquad (8)$$

$$\underline{\phi}_k[n] = \begin{cases} \underline{\varepsilon}_k[n] & \text{for} \quad k=1,\ldots,N \\ \underline{\varepsilon}_k[n] + F\underline{\delta}_k[n] + \underline{\lambda}_k[n] & \text{for} \quad k=N+1,\ldots,N+C \end{cases} \qquad (9)$$

UNITED STATES PATENT AND TRADEMARK OFFICE
CERTIFICATE OF CORRECTION

PATENT NO. : 4,964,126
DATED : October 16, 1990
INVENTOR(S) : Bruce R. Musicus, et al It is certified that error appears in the above-identified patent and that said Letters Patent is hereby corrected as shown below:

$$\underline{s}[n] = \begin{pmatrix} s_{N+1}[n] \\ \vdots \\ s_{N+C}[n] \end{pmatrix} \qquad \underline{\phi}[n] = \begin{pmatrix} \phi_1[n] \\ \vdots \\ \phi_{N+C}[n] \end{pmatrix} \qquad (10)$$

$$\underline{s}[n] = -W\underline{\phi}[n] \qquad (13)$$

$$\underline{s}[n] = -W_k\underline{\phi}_k[n] \qquad (14)$$

$$p\left(\underline{\phi}_k[n] \mid H_0\right) = N\left(\underline{0}, \Phi_k\right) \qquad (17)$$

$$\underline{v}[n] = \begin{pmatrix} \underline{v}_1[n] \\ \vdots \\ \underline{v}_N[n] \end{pmatrix} \qquad \underline{\bar{v}}[n] = \begin{pmatrix} \underline{\bar{v}}_1[n] \\ \vdots \\ \underline{\bar{v}}_N[n] \end{pmatrix} \qquad (19)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$\begin{pmatrix} \underline{v}[n] \\ \underline{s}[n] \end{pmatrix} = \begin{pmatrix} \bar{\underline{v}}[n] \\ \underline{0} \end{pmatrix} + \begin{pmatrix} I & 0 \\ -W & \end{pmatrix} \underline{\phi}[n] \tag{20}$$

$$p\left( \begin{pmatrix} \underline{v}[n] \\ \underline{s}[n] \end{pmatrix} \Big| H_0, \bar{\underline{v}}[n] \right) = N\left( \begin{pmatrix} \bar{\underline{v}}[n] \\ \underline{0} \end{pmatrix}, \begin{pmatrix} I & 0 \\ -W & \end{pmatrix} \Phi \begin{pmatrix} I & -W^T \\ 0 & \end{pmatrix} \right) \tag{21}$$

$$p(\underline{s}[n]|H_0) = N(\underline{0}, V) \tag{22}$$

$$p\left( \underline{\phi}_k[n] \Big| H_k, \bar{\underline{\phi}}_k[n] \right) = N\left( \bar{\underline{\phi}}_k[n], \bar{\Phi}_k \right) \tag{24}$$

$$p\left( \begin{pmatrix} \underline{v}[n] \\ \underline{s}[n] \end{pmatrix} \Big| H_k, \bar{\underline{v}}[n], \bar{\underline{\phi}}_k[n] \right) = N\left( \begin{pmatrix} \bar{\underline{v}}[n] \\ \underline{0} \end{pmatrix} + \begin{pmatrix} I_k \\ -W_k \end{pmatrix} \bar{\underline{\phi}}_k[n], \begin{pmatrix} I & 0 \\ -W & \end{pmatrix} \bar{\Phi} \begin{pmatrix} I & -W^T \\ 0 & \end{pmatrix} \right) \tag{25}$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$p\left(\underline{s}[n] \mid H_k, \underline{\bar{v}}[n], \underline{\bar{\Phi}}_k[n]\right) = N\left(-W_k\underline{\bar{\Phi}}_k[n], \sum_{\substack{m=1 \\ m \neq k}}^{N+C} W_m \Phi_m W_m^T + W_k \bar{\Phi}_k W_k^T\right)$$

$$= N\left(-W_k\underline{\bar{\Phi}}_k[n], V - W_k \Delta \Phi_k W_k^T\right) \quad (26)$$

$$L_0 = \log p\left(\underline{s}[n], H_0\right) \quad (27)$$

$$L_k[n] = \max_{\underline{\bar{\Phi}}_k} \log p\left(\underline{s}[n], H_k \mid \underline{\bar{\Phi}}_k[n]\right) \quad \text{for } k=1,\ldots,N+C$$

$$\|\underline{v}\|^2_{V^{-1}} = \underline{v}^T V^{-1} \underline{v} \quad (28)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$\hat{\underline{\phi}}_k[n] \leftarrow \min_{\underline{\phi}_k[n]} \left\| \underline{s}[n] + W_k \overline{\underline{\phi}}_k[n] \right\|^2_{V^{-1}} \qquad (29)$$

$$\hat{\underline{\phi}}_k[n] = -\left[ W_k^T V^{-1} W_k \right]^{-1} W_k^T V^{-1} \underline{s}[n] \qquad \text{for } k=1,\ldots,N+C \qquad (30)$$

$$L_0[n] = -\frac{1}{2} \left\| \underline{s}[n] \right\|^2_{V^{-1}} + \gamma_0 \qquad (31)$$

$$L_k[n] = -\frac{1}{2} \left\| \underline{s}[n] + W_k \hat{\underline{\phi}}_k[n] \right\|^2_{V^{-1}} + \gamma_k \qquad \text{for } k=1,\ldots,N+C$$

$$L'_0[n] = 0 \qquad (33)$$

$$L'_k[n] = \left\| W_k \hat{\underline{\phi}}_k[n] \right\|^2_{V^{-1}} + \gamma'_k \qquad \text{for } k=1,\ldots,N+C$$

UNITED STATES PATENT AND TRADEMARK OFFICE
CERTIFICATE OF CORRECTION

PATENT NO. : 4,964,126
DATED : October 16, 1990
INVENTOR(S) : Bruce R. Musicus, et al It is certified that error appears in the above-identified patent and that said Letters Patent is hereby corrected as shown below:

$$\hat{\underline{v}}_k[n] = \underline{v}[n] - \hat{\underline{\Phi}}_k[n] \tag{35}$$

$$L_0[n] = \max_{\overline{\underline{v}}} \log p\left(\underline{v}[n], \underline{s}[n], H_0 \big| \overline{\underline{v}}[n]\right)$$

$$L_k[n] = \max_{\overline{\underline{v}}} \max_{\overline{\underline{\Phi}}_k} \log p\left(\underline{v}[n], \underline{s}[n], H_k \big| \overline{\underline{v}}[n], \overline{\underline{\Phi}}_k[n]\right) \tag{36}$$

$$\hat{\underline{v}}_m[n] = \underline{v}_m[n] + \Phi_m W_m^T V^{-1} \underline{s}[n] \qquad \text{for } m=1,\ldots,N \tag{37}$$

$$\overline{\Phi}_k = \overline{\sigma}_k^2 I \tag{45}$$

$$\gamma_k' = -q \log\left(1 - \frac{(\sigma_k^2 - \overline{\sigma}_k^2)}{\sigma_V^2} r_{kk}\right) + 2\log\left(\frac{P_k}{1-P_k}\right) \tag{48}$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$\gamma'_k = -q \log\left(\frac{\bar{\sigma}_k^2}{\sigma_k^2}\right) + 2\log\left(\frac{P_k}{1-P_k}\right) \quad (49)$$

$$\text{If} \quad \underline{s}_{N+1}^T[n] V^{-1} \underline{s}_{N+1}[n] > \gamma \quad \text{then FAILURE} \quad (52)$$

$$\hat{\underline{y}}_m[n] = \underline{y}_m[n] + w_{N+1,m} \Phi_m V^{-1} \underline{s}_{N+1}[n] \quad \text{for } m=1,\ldots,N \quad (54)$$

$$\hat{\underline{y}}_m[n] = \underline{y}_m[n] \quad \text{for } m=1,\ldots,N \quad (55)$$

$$\text{Prob}\left(\text{Guess } H_m \mid H_k \text{ is correct}\right) = \int_{H_m} p\left(\underline{s}[n] \mid H_k, \bar{\Phi}_k[n]\right) d\underline{s} \quad (59)$$

$$L'_k[n] = \underline{s}^T[n] V^{-1} W_k \left(W_k^T V^{-1} W_k\right)^{-1} W_k^T V^{-1} \underline{s}[n] + \gamma'_k \quad (60)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$E\left[L'_m \middle| H_k, \bar{\Phi}_k\right] = q + \gamma_m + \frac{r^2_{mk}}{r_{mm}}\left(\frac{\|\bar{\Phi}_k\|^2 - q\left(\bar{\sigma}^2_k - \sigma^2_k\right)}{\sigma^2_v}\right) \quad (62)$$

$$E\left[\hat{\bar{v}}_m[n] \middle| H_0\right] = \bar{v}_m[n]$$

$$E\left[\hat{\bar{v}}_m[n] \middle| H_k, \bar{\Phi}_k[n]\right] = \bar{v}_m[n] \quad \text{for } k=1,\ldots,N+C \quad (64)$$

$$\text{Var}\left(\hat{\bar{v}}_k[n] \middle| H_k, \bar{\Phi}_k[n]\right) = R^{-1}_{kk} - \Phi_k \quad (66)$$

$$\text{Cov}\left[\hat{\bar{v}}_m[n], \hat{\bar{v}}_p[n] \middle| H_0\right] = \Phi_m \delta_{mp} - \Phi_m R_{mp} \Phi_p \quad (67)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$\text{Cov}\left[\overset{\Delta}{\underline{v}}_m[n], \overset{\Delta}{\underline{v}}_p[n] \Big| H_k, \overline{\underline{\Phi}}_k[n]\right] = \Phi_m \delta_{mp} - \Phi_m \left[R_{mp} - R_{mk} R_{kk}^{-1} R_{kp}\right] \Phi_p \quad (68)$$

$$\text{Cov}\left[\overset{\Delta}{\underline{v}}_m[n], \overset{\Delta}{\underline{y}}_k[n] \Big| H_k, \overline{\underline{\Phi}}_k[n]\right] = \Phi_m R_{mk} R_{kk}^{-1} \quad (69)$$

$$\text{Set } b_k[n] = \begin{cases} 1 & \text{if } \|\underline{s}_k[n]\|^2 > \gamma \\ 0 & \text{else} \end{cases} \quad \text{for } k=N+1,\ldots,N+C \quad (74)$$

$$\text{Set } b_k[i,n] = \begin{cases} +1 & \text{if the i}^{th} \text{ element of } \underline{s}_k[n] \text{ is } > \gamma \\ 0 & \text{if the i}^{th} \text{ element of } |\underline{s}_k[n]| \text{ is } < \gamma \\ -1 & \text{if the i}^{th} \text{ element of } \underline{s}_k[n] \text{ is } < -\gamma \end{cases} \quad (75)$$

$$L_{k_1\ldots k_K} = \max_{\overline{\underline{\Phi}}_{k_1},\ldots,\overline{\underline{\Phi}}_{k_K}} \log p\left(\underline{s}, H_{k_1\ldots k_K} \Big| \overline{\underline{\Phi}}_{k_1},\ldots,\overline{\underline{\Phi}}_{k_K}\right) \quad (78)$$

UNITED STATES PATENT AND TRADEMARK OFFICE
CERTIFICATE OF CORRECTION

PATENT NO.  : 4,964,126

DATED       : October 16, 1990

INVENTOR(S) : Bruce R. Musicus, et al

It is certified that error appears in the above-identified patent and that said Letters Patent is hereby corrected as shown below:

$$\hat{\underline{\phi}}_{k_1},\ldots,\hat{\underline{\phi}}_{k_K} \leftarrow \min_{\underline{\phi}_{k_1},\ldots,\underline{\phi}_{k_K}} \left\| \underline{s} + \sum_{k=1}^{K} W_{k_i} \underline{\phi}_{k_i} \right\|^2_{V^{-1}} \qquad (79)$$

$$\begin{bmatrix} \hat{\underline{\phi}}_{k_1} \\ \vdots \\ \hat{\underline{\phi}}_{k_K} \end{bmatrix} = - \left[ \begin{bmatrix} W^T_{k_1} \\ \vdots \\ W^T_{k_K} \end{bmatrix} V^{-1} \begin{bmatrix} W_{k_1} \cdots W_{k_K} \end{bmatrix} \right]^{-1} \begin{bmatrix} W^T_{k_1} \\ \vdots \\ W^T_{k_K} \end{bmatrix} V^{-1} \underline{s} \qquad (80)$$

$$L_0 = -\frac{1}{2} \|\underline{s}\|^2_{V^{-1}} + \gamma_0$$

$$L_{k_1\cdots k_K} = -\frac{1}{2} \left\| \underline{s} + \sum_{i=1}^{K} W_{k_i} \hat{\underline{\phi}}_{k_i} \right\|^2_{V^{-1}} + \gamma_{k_1\cdots k_K} \qquad (81)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$L'_{k_1 \ldots k_K} = 2(L_{k_1 \ldots k_K} - L_0)$$

$$= -\underline{s}^T V^{-1} \begin{bmatrix} W_{k_1} \cdots W_{k_K} \end{bmatrix} \begin{bmatrix} \hat{\underline{\phi}}_{k_1} \\ \vdots \\ \hat{\underline{\phi}}_{k_K} \end{bmatrix} + \gamma'_{k_1 \ldots k_K} \qquad (82)$$

$$\rho_{k,l} = \frac{1}{\sigma_v^2} \underline{s}_k^T \underline{s}_l \qquad \text{for } k=N+1,\ldots,N+C \text{ and } l=k,\ldots,N+C \qquad (83)$$

$$\hat{\underline{v}}_{\hat{k}_i} = \underline{v}_{\hat{k}_i} - \hat{\underline{\phi}}_{\hat{k}_i} \qquad \text{for } i=1,\ldots,\hat{K} \qquad (86)$$

$$\hat{\underline{\phi}}_{k_i} = -\sum_{m=N+1}^{N+C} \tilde{w}_{m,k_i} \underline{s}_m \qquad (87)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$\begin{bmatrix} \tilde{w}_{N+1,k_1} & \cdots & \tilde{w}_{N+C,k_1} \\ \vdots & \cdots & \vdots \\ \tilde{w}_{N+1,k_K} & \cdots & \tilde{w}_{N+C,k_K} \end{bmatrix} = \begin{bmatrix} r_{k_1 k_1} & \cdots & r_{k_1 k_K} \\ \vdots & \cdots & \vdots \\ r_{k_K k_1} & \cdots & r_{k_K k_K} \end{bmatrix}^{-1} \begin{bmatrix} w_{N+1,k_1} & \cdots & w_{N+C,k_1} \\ \vdots & \cdots & \vdots \\ w_{N+1,k_K} & \cdots & w_{N+C,k_K} \end{bmatrix} \quad (88)$$

$$\hat{\underline{v}}_m = \begin{cases} \underline{v}_m + \dfrac{\sigma_m^2}{\sigma_v^2}\left( \displaystyle\sum_{l=N+1}^{N+C} w_{l,m}\underline{s}_l + \sum_{i=1}^{K} r_{m,k_i}\hat{\underline{\phi}}_{k_i} \right) & \text{for } m \neq k_1,\ldots,k_K \\[2ex] \underline{v}_m - \hat{\underline{\phi}}_m & \text{for } m = k_1,\ldots,k_K \end{cases} \quad (89)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$L'_{k_1 \ldots k_K} = 2(L_{k_1 \ldots k_K} - L_0)$$

$$= -\underline{s}^T V^{-1} \begin{bmatrix} W_{k_1} \cdots W_{k_K} \end{bmatrix} \begin{bmatrix} \hat{\underline{\phi}}_{k_1} \\ \vdots \\ \hat{\underline{\phi}}_{k_K} \end{bmatrix} + \gamma'_{k_1 \ldots k_K} \quad (82)$$

$$\rho_{k,l} = \frac{1}{\sigma_v^2} \underline{s}_k^T \underline{s}_l \quad \text{for } k=N+1,\ldots,N+C \text{ and } l=k,\ldots,N+C \quad (83)$$

$$\hat{\underline{v}}_{k_i} = \underline{v}_{k_i} - \hat{\underline{\phi}}_{k_i} \quad \text{for } i=1,\ldots,\hat{K} \quad (86)$$

$$\hat{\underline{\phi}}_{k_i} = -\sum_{m=N+1}^{N+C} \tilde{w}_{m,k_i} \underline{s}_m \quad (87)$$

UNITED STATES PATENT AND TRADEMARK OFFICE
CERTIFICATE OF CORRECTION

PATENT NO. : 4,964,126

DATED : October 16, 1990

INVENTOR(S) : Bruce R. Musicus, et al

It is certified that error appears in the above-identified patent and that said Letters Patent is hereby corrected as shown below:

$$\begin{bmatrix} \tilde{w}_{N+1,k_1} & \cdots & \tilde{w}_{N+C,k_1} \\ \vdots & \cdots & \vdots \\ \tilde{w}_{N+1,k_K} & \cdots & \tilde{w}_{N+C,k_K} \end{bmatrix} = \begin{bmatrix} r_{k_1 k_1} & \cdots & r_{k_1 k_K} \\ \vdots & \cdots & \vdots \\ r_{k_K k_1} & \cdots & r_{k_K k_K} \end{bmatrix}^{-1} \begin{bmatrix} w_{N+1,k_1} & \cdots & w_{N+C,k_1} \\ \vdots & \cdots & \vdots \\ w_{N+1,k_K} & \cdots & w_{N+C,k_K} \end{bmatrix} \quad (88)$$

$$\hat{\underline{v}}_m = \begin{cases} \underline{v}_m + \dfrac{\sigma_m^2}{\sigma_v^2} \left( \displaystyle\sum_{l=N+1}^{N+C} w_{l,m} \underline{s}_l + \sum_{i=1}^{K} r_{m,k_i} \hat{\underline{\phi}}_{k_i} \right) & \text{for } m \neq k_1, \ldots, k_K \\ \underline{v}_m - \hat{\underline{\phi}}_m & \text{for } m = k_1, \ldots, k_K \end{cases} \quad (89)$$

Signed and Sealed this

Eighteenth Day of August, 1992

Attest:

DOUGLAS B. COMER

*Attesting Officer*  *Acting Commissioner of Patents and Trademarks*